United States Patent
Willis

(10) Patent No.: US 10,137,731 B2
(45) Date of Patent: Nov. 27, 2018

(54) WHEEL PAD

(76) Inventor: Douglas G. Willis, Fresno, CA (US)

( * ) Notice: Subject to any disclaimer, the term of this patent is extended or adjusted under 35 U.S.C. 154(b) by 0 days.

(21) Appl. No.: 13/288,959

(22) Filed: Nov. 3, 2011

(65) Prior Publication Data

US 2017/0071340 A1     Mar. 16, 2017

Related U.S. Application Data

(60) Provisional application No. 61/409,910, filed on Nov. 3, 2010.

(51) Int. Cl.
  B60B 33/08     (2006.01)
  B60B 33/00     (2006.01)

(52) U.S. Cl.
  CPC ............. B60B 33/00 (2013.01); B60B 33/08 (2013.01); *B60B 2900/721* (2013.01)

(58) Field of Classification Search
  CPC ............ B60B 2380/00; B60B 2380/10; B60B 2380/12; B60B 2380/14; B60B 2380/60; B60B 2380/90; B60B 33/0028; B60B 33/08; F16C 33/76; F16C 33/723; F16C 33/761; F16C 33/78
  USPC ....................... 16/24, 25, 26, 18 CG; 384/49; 193/35 MD
  See application file for complete search history.

(56) References Cited

U.S. PATENT DOCUMENTS

| | | | | |
|---|---|---|---|---|
| 1,222,045 A * | 4/1917 | Sobilo | ..................... | B60B 33/08 16/26 |
| 1,407,171 A * | 2/1922 | Roth | ....................... | B60B 33/08 16/26 |
| 1,440,641 A * | 1/1923 | Stevens | .................... | B60B 33/08 16/26 |
| 2,690,584 A * | 10/1954 | Freddolino | ............. | B60B 33/08 16/26 |
| 2,972,162 A * | 2/1961 | Townsend | ............. | F16C 29/046 16/26 |
| 5,114,244 A * | 5/1992 | Dunham | .................. | F16C 17/03 384/103 |
| 5,230,571 A * | 7/1993 | Estkowski | .......... | B60B 33/0028 16/18 A |
| 5,375,679 A * | 12/1994 | Biehl | .................... | B23D 47/025 182/181.1 |
| 5,906,247 A * | 5/1999 | Inoue | ...................... | B60B 19/14 16/26 |
| 7,186,026 B2 * | 3/2007 | Nagata | .................. | F16C 17/024 384/104 |

(Continued)

*Primary Examiner* — Emily M Morgan
(74) *Attorney, Agent, or Firm* — Richard A. Ryan

(57) ABSTRACT

A wheel pad for moving an object across a surface having non-planar obstructions to allow movement of the object across the surface. The wheel pad has a contact pad and a load bearing assembly. The contact pad has an outer skin enclosing a fluid and a torus bearing. The torus bearing has a plurality of bearings, with each adjacent bearing rotatably joined by a connector that allows the bearings to independently rotate. The load bearing assembly has a load transfer mechanism and a load transfer device. The load transfer mechanism has a plurality of recirculating bearings moveably positioned inside a ball chamber. The load transfer device interacts with, but moves independently of, the load transfer mechanism to transfer the weight of the object to the contact pad, which weight is transferred to a lower surface thereof by the fluid and torus bearing to provide omnidirectional movement for the wheel pad.

16 Claims, 16 Drawing Sheets

(56) References Cited

U.S. PATENT DOCUMENTS

| | | | |
|---:|---:|---|---|
| 9,133,877 B2* | 9/2015 | Yamazaki | F16C 33/3825 |
| 2007/0058890 A1* | 3/2007 | Al-Bender | F16C 17/024 |
| | | | 384/104 |
| 2010/0247012 A1* | 9/2010 | Reitz | F16C 33/6688 |
| | | | 384/462 |

* cited by examiner

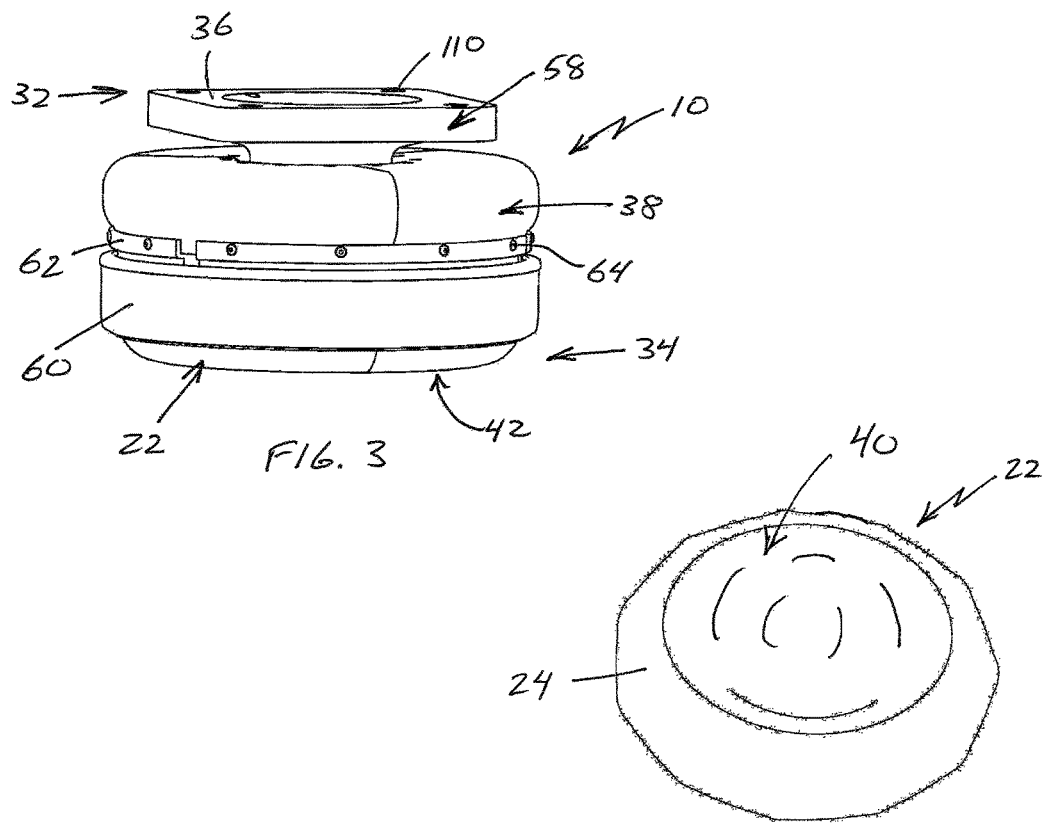
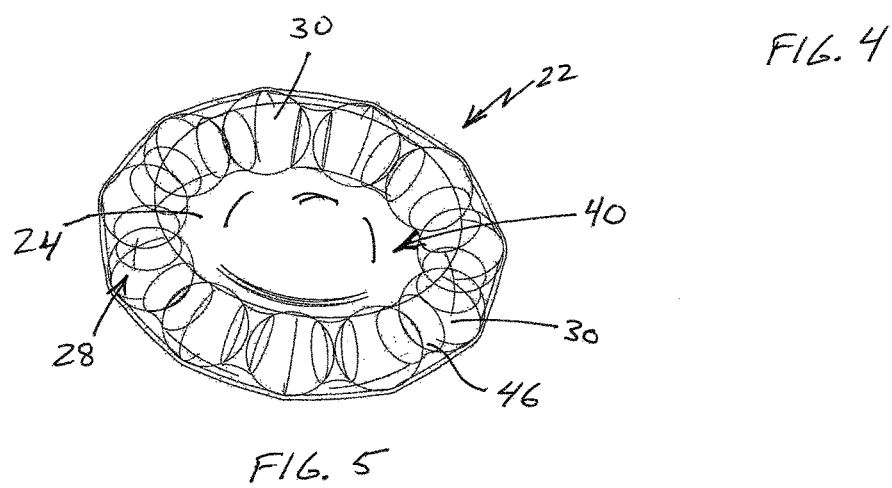

WHEEL PAD

REFERENCE TO RELATED APPLICATIONS

This patent application claims priority to U.S. Provisional Patent Application No. 61/409,910 filed Nov. 3, 2010.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to casters, floats and like mobility apparatuses that are utilized to moveably support a load across a surface. In particular, the present invention relates to mobility apparatuses that moveably support a load across an uneven or irregular surface. Even more particularly the present invention relates to such mobility apparatuses that utilize a fluid-filled pad to carry large, heavy loads across an uneven or irregular surface.

B. Background

Casters, wheel floats and carriage assemblies, typically comprising one or more casters or wheel floats, are generally well known and commonly utilized to assist in moving an object from one location to another across a surface. A conventional carriage assembly is attached to, integral with or otherwise configured to support a frame or the like having a support surface on which the object rests or is attached in a manner that allows the user to move the object with much less effort than would otherwise be required. Such carriage assemblies are utilized in numerous types of industry, in the home, in the medical field and, generally, anywhere it is either necessary or desirable to efficiently and safely move an object across a surface. For instance, airplane, automobile and other vehicle factories utilize carriage assemblies to move engines, frames, transmissions and other components from one part of the factory to another. Carriage assemblies are also utilized in hospitals with hospital beds, operating tables and powered chairs to move patients from one location in the hospital to another.

Although conventional carriage assemblies, as well as individual casters, tend to function well on smooth surfaces, they generally do not function very well on surfaces that are uneven and/or irregular. Even surfaces that appear to be planar will often, if not usually, have areas where the surface is not planar. For instance, many concrete or other hard, relatively smooth surfaces have one or more expansion joints, door jambs and tracks, markings and the like that must be passed over or crossed to transfer the object, moveably supported by the carriage assembly or caster, across the surface. In addition, conventional carriage assemblies and casters also tend to not function well on surfaces that have small obstructions, such as rocks, screws, bolts and such, on the surface in the path where a wheel of the carriage assembly or caster will traverse. Such objects are commonly found on factory and other floors. As well known, when a wheel of a carriage assembly or caster attempts to pass over an uneven or irregular area of the surface or a small object on the surface, the wheel tends to have difficulty. The difficulty of passing across such an area or over such obstructions is significantly compounded when the load is heavy. Such difficulty can substantially decrease the efficient operation of moving the object.

In addition to the loss of efficiency, the problems associated with moving a heavy object across a surface on a frame or the like supported above the surface by a conventional carriage assembly or caster include the risk of tipping due to the carriages/casters being inherently unstable on uneven and irregular surfaces and surfaces having small obstructions. The risk of tipping is substantially increased when changing directions and under other circumstances, including when the carriage/caster encounters something on the surface that tends to restrict travel in the selected direction. Generally, the instability results from the carriage/caster having a support post that is offset a distance away from the wheel axle. The load supported by the carriage/caster tends to bear down through the support post, which produces a tipping moment relative to the wheel axle. In addition, the angled vector of the weight of the object being moved tends to be higher than the wheel axle and, therefore, will drive the wheel down against the uneven or irregular surface or the obstruction on the surface, making it more difficult to traverse that area or obstruction.

Various carriage assemblies and casters have been devised which are better adapted to move an object, particularly a heavy object, across an uneven or irregular surface and over obstructions on the surface. One such prior art caster is set forth in U.S. Pat. No. 5,507,069, which issued to the inventor of the present invention. This patent describes an articulated caster having a base assembly with three or more wheels attached thereto and extending radially from the center of the base and a pivot arm having a housing at a lower end that is received in a recessed area of the base. The upper end of the pivot arm connects to the apparatus using the caster. The pivot housing includes a spherical chamber that contains a pivot ball. A pivot shaft passes through a pivot hole in the pivot ball, an angled slot in the housing and through a pair of pivot shaft holes provided in the opposing walls of the base recess area. The pivot holes are disposed as low as possible for improved stability. U.S. Pat. Nos. 7,146,683, 7,500,285 and 7,506,405, which also issued to the inventor of the present invention, describes an articulated caster comprising a base assembly, at least three wheels pivotally attached to the base assembly, a pivot arm having an upper end configured to attach to an object to be moved and a universal joint at a lower end of the pivot arm that is attached to the base and configured for pivotal motion about two perpendicular axes. A brake assembly, attached to the pivot arm, is configured to force a brake pad into frictional engagement with a surface to place the brake assembly in its engaged position. These patents also describe combining multiple casters together to form a compound carriage system to support larger and/or heavier loads without excessive elevation of such loads and describe a carriage system wherein the load is carried on a load supporting section of a frame between pairs of carriages.

One known disadvantage of most prior art carriage assemblies and casters, including those described above, is that the components thereof require varying degrees of machining, welding and/or break bending to configure the carriage/caster for use with a frame to move an object across a surface. As is well known, such operations increase the cost of assembling the carriage/caster, both in materials and in labor, and result in structural weak points that can fail or otherwise reduce the useful life of the carriage/caster. In certain circumstances, the impact of these operations can significantly impact the cost and life of the carriage/caster. In addition to increasing the initial cost, the manner in which prior art carriages and casters are configured makes it difficult and relatively expensive to repair any parts that fail or replace any parts that have worn.

The present inventor is a co-inventor of an articulating carriage that effectively, efficiently and safely moves an object across a surface, including areas of the surface that are uneven or irregular or which have small obstructions thereon, by not being impeded by such areas or obstructions and being stable during use. This articulating carriage, which is referred to as a wheel float and is the subject of U.S. patent application Ser. No. 12/754,593, generally comprises a walking beam assembly that is configured to move across a surface, a pedestal that is supported above the surface by the walking beam assembly and attached to the object, directly or indirectly, to be moved across the surface and a pivoting mechanism that allows the walking beam assembly to pivot relative to the pedestal so the articulating carriage may move over planar and non-planar areas, including obstructions, on the surface without stopping and/or potentially dropping the object onto the surface. The walking beam assembly has a base plate, a first caster assembly at its first end, a second caster assembly at its second end, a first hanger supported by the base plate and a second hanger supported by the base plate in spaced apart relation to the first hanger.

While the above patents and patent application are substantial improvements over prior art casters, there is a need for an improved mobility apparatus for use to move objects across an uneven or irregular surface and across a surface having small obstructions in the path of the of the mobility apparatus. Specifically, what is needed is a mobility apparatus that is more effective and efficient at moving an object, particularly heavy and/or large objects, across a surface which is uneven or irregular or which contains obstructions that could impede the movement of the apparatus. The preferred mobility apparatus should be configured such that it drives the object over any uneven or irregular areas and any obstructions, it is stable while going over such areas or obstructions, it is relatively close to the surface for ease of loading and unloading the object, has relatively low resistance as it moves across the surface and is able to relatively easily make directional changes. Preferably, the mobility apparatus should be configured to move easily across a wide variety of different types of surfaces. The preferred mobility apparatus should be configured to be joined on a frame or other structure with like apparatuses so as to provide a carriage system that can efficiently and safely move large and/or heavy objects across a surface.

SUMMARY OF THE INVENTION

The wheel pad of the present invention provides the benefits and solves the problems disclosed above. That is to say, the present invention discloses a mobility apparatus or wheel pad which effectively, efficiently and safely moves an object across a surface, including areas of the surface that are uneven or irregular or which have small obstructions thereon, by not being impeded by such areas or obstructions and being stable during use. The wheel pad of the present invention has a low driving moment such that when it hits an uneven or irregular area or an obstruction, the wheel pad is driven up over the area or obstruction so as not to impede movement of the object being moved across the surface. The wheel pad of the present invention places the frame or other support to which it is attached and on which the object is carried close to the ground for ease of loading and unloading the object. The wheel pad of the present invention can be joined with like wheel pads to provide a carriage system that efficiently and safely moves large and/or heavy objects across a surface, including surfaces that are uneven or irregular or which have small obstructions thereon.

The articulating carriage of the present invention provides a high temperature tolerance for autoclave and like operations, such as are commonly utilized in the aerospace industry. In the preferred embodiment, the articulating carriage is tolerant of outdoor, dirty and/or corrosive environments. As such, the articulating carriage of the present invention is particularly useful for custom, temporary and/or military deployment applications, such as those where the carriage system may be left behind or disposed of at forward locations after a mission is accomplished rather than returned for further use. These and other benefits of the present invention will be readily understood and appreciated by those skilled in the art.

It is therefore the primary objective of the present invention to provide an improved mobility apparatus that provides the advantages discussed above and overcomes the disadvantages and limitations which are associated with presently available mobility apparatuses, including wheel floats and casters.

It is also an important objective of the present invention to provide a wheel pad that effectively, efficiently and safely moves an object across a variety of different surfaces, including areas of the surface that are uneven or irregular or which have small obstructions thereon.

It is also an important objective of the present invention to provide a wheel pad that is stable even when moving large or heavy objects across uneven or irregular surface and when changing direction.

It is also an important objective of the present invention to provide a wheel pad that has a low driving moment to drive a load bearing structure over an uneven or irregular area of a surface or a small obstruction on the surface in order to not impede movement of the object being moved.

Another important objective of the present invention is to provide a wheel pad that can be joined with other wheel pads to provide a carriage system which efficiently and safely moves large and/or heavy objects across a surface, including surfaces that are uneven or irregular or which have small obstructions thereon.

Yet another objective of the present invention to provide an improved articulating carriage that is relatively inexpensive to manufacture and easy to use for moving objects across a surface.

The above and other objectives of the present invention will become readily apparent and are explained in greater detail by reference to the attached figures and the description of the preferred embodiment which follows. As forth herein, the present invention resides in the novel features of form, construction, mode of operation and/or combination of processes presently described and understood by the claims.

BRIEF DESCRIPTION OF THE DRAWINGS

In the drawings which illustrate the preferred embodiments and the best modes presently contemplated for carrying out the present invention:

FIG. 3 is a side view of a wheel pad configured according to the principles and concepts of a first embodiment of the present invention showing the load base wheel pad assembly;

FIG. 4 is a top perspective view of the contact pad utilized with the wheel pad apparatus of the present invention;

FIG. 5 is a top perspective view of the contact pad of FIG. 4 with the outer skin shown as transparent to particularly illustrate the torus bearing disposed therein;

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed description and drawings set forth and illustrate one or more of the preferred embodiments and, as such, represent one or more ways of configuring the present invention. Although specific components, materials, configurations and uses are illustrated, it should be understood that a number of variations to the components and to the configuration of those components described herein and in the accompanying figures can be made without changing the scope and function of the present invention. For instance, although the various figures and the description provided herein are directed to certain configurations of the wheel pad and certain relationships between the components thereof, those skilled in the art will readily understand that this is merely for purposes of simplifying the present disclosure and that the present invention is not so limited.

Figure 1:
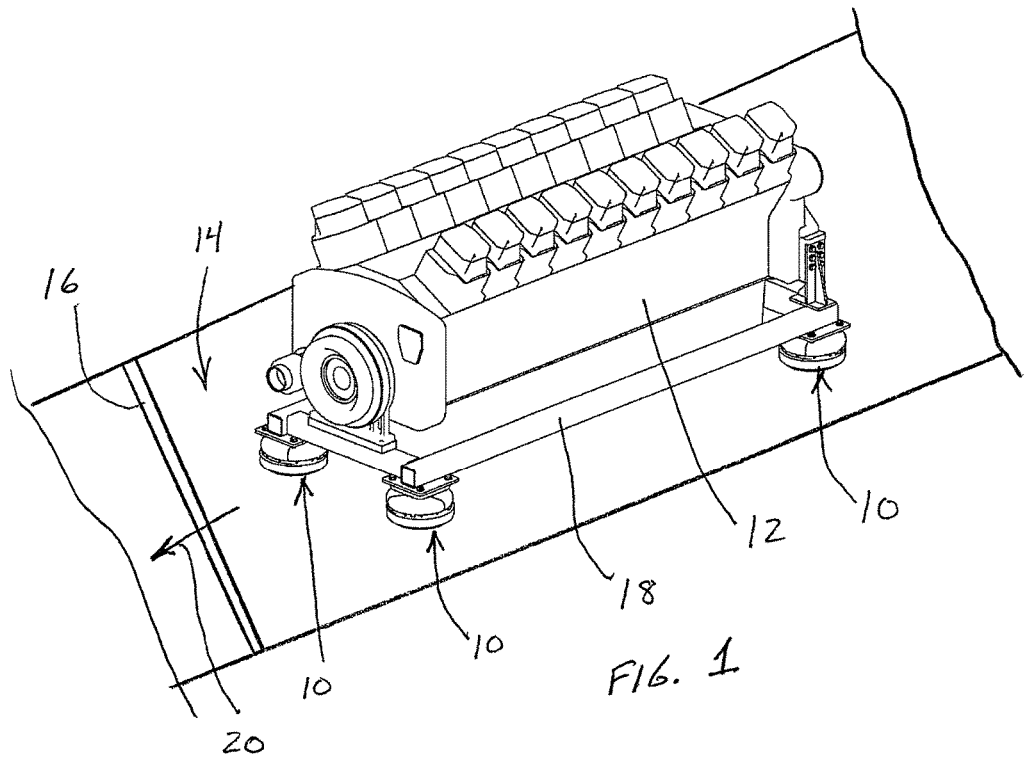
FIG. 1 is a side perspective view of an engine supported by a frame being moved across a surface having a non-planar area by a plurality of wheel pads configured according to a first embodiment of the present invention.
Figure 2:
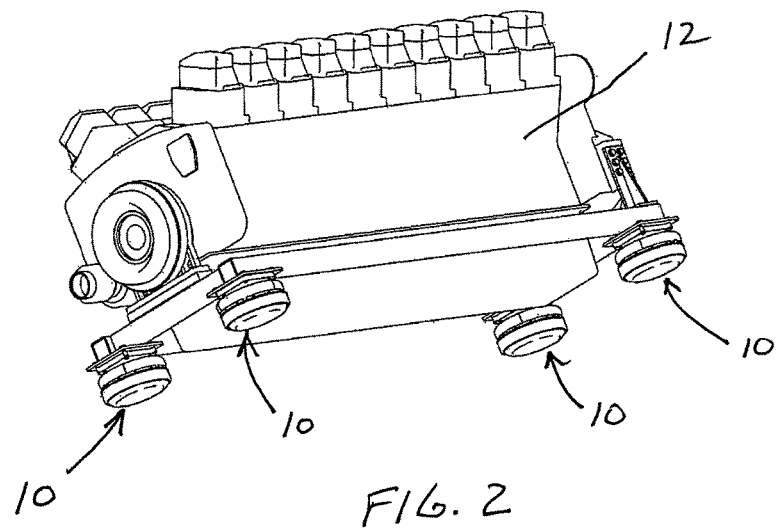
FIG. 2 is a bottom perspective view of the engine, frame and wheel pads of FIG. 1 showing the wheel pads mounted to the frame.

A wheel pad mobility apparatus that is manufactured out of the components and configured pursuant to various preferred embodiments of the present invention is shown generally as 10 in the figures. As shown in FIGS. 1, 2, 20, 21, 25 and 26, the components of which are explained in more detail below, wheel pad 10 of the present invention can be utilized to move an object 12, such as an engine, across a surface 14, such as a floor or the like, that may have an uneven or irregular area or an obstruction, which are collectively referred to herein as a non-planar area 16. Typically, the object 12 will rest on or be attached to a support structure, such as the frame 18 or the like, that is supported above and usually attached to a plurality of wheel pads 10, as shown in FIGS. 1 and 2, to prevent the wheel pads 10 from moving relative to frame 18 (e.g., such as separating therefrom). In FIG. 1, the object 12 is shown being transported on frame 18 along a surface 14 having a non-planar area 16 in its direction of travel 20. As set forth above, prior art carriages and casters typically have problems, including getting stuck and having stability issues, when attempting to move across non-planar area 16, particularly when the object 12 is large and/or heavy. In fact, the object 12 is often subject to tilting due to being so unstable. As set forth in more detail below, the wheel pad 10 of the present invention solves these problems.

The wheel pad 10 of the present invention utilizes a combination of fluid flotation and ball bearing mobility to provide low resistance movement across surface 14, omnidirectional movement, relatively easy and seamless directional change, near seamless transition over the non-planar area 16 (including, but not limited to, thresholds, carpet, soft under footing and rough floor conditions), high flotation and stable movement of even large, heavy objets 12. In addition to the foregoing, the wheel pad 10 has the potential for being modified to enable self-propelled movement across surface 14. The wheel pad 10 of each embodiment described below comprises a contact pad 22 having an outer skin 24 that defines a pad chamber 26 filled with fluid, such as oil or other liquids and/or compressed gas, and which comprises a ring-shaped or torus bearing 28 having a plurality of bearings 30 formed in a generally toroidal shape, as best shown in FIGS. 5-8. As set forth in more detail below, the contact pad 22 is configured to slide across the surface 14 while supporting the object 12, typically on frame 18, in a manner that is able to pass over any non-planar areas in its direction of travel 20.

As shown in FIG. 3, the wheel pad 10 has an upper end 32 and a lower end 34, with the upper end 32 typically comprising a connecting plate 36 that, in one embodiment, connects to or is made integral with frame 18 and the lower end 34 comprising the contact pad 22 that contacts and moves across the surface 14. Disposed between the contact pad 22 and connecting plate 36 is an upper housing 38 that encloses the components of wheel pad 10 which provide the stability for moveably supporting the object 12. In one embodiment, the outer skin 24 of the contact pad 22 is made of rubber or a rubber-like material that is reinforced with threaded fabric piles which prevents outer skin 24 from stretching and/or expanding under pressure. As shown in FIGS. 3-7 and 9-10, the outer skin 24 forms an upper surface 40 and a lower surface 42 of contact pad 22. As best shown in FIGS. 9 and 12-17, when the weight of the object 12 and, as applicable, frame 18 is received on upper surface 40, the upper surface 40 deforms to form a generally concave shaped cavity 44 which supports the components of wheel pad 10, set forth below, which stabilizes and supports the object 12. Lower surface 42 makes direct contact with the surface 14 to distribute the load from object 12 and, as applicable, the frame 18 to the surface 14 substantially evenly across the lower surface 42.

Figure 6:
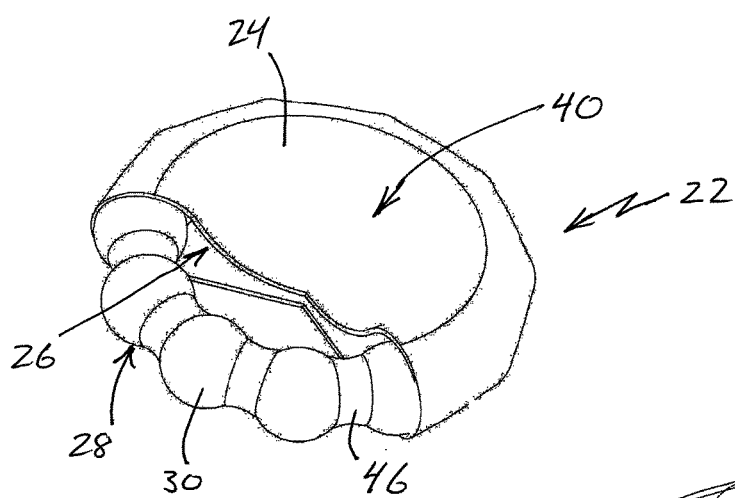
FIG. 6 is a top perspective view of the contact pad of FIG. 4 with the outer skin partially cut away to show the pad chamber and the torus bearing disposed therein.
Figure 7:
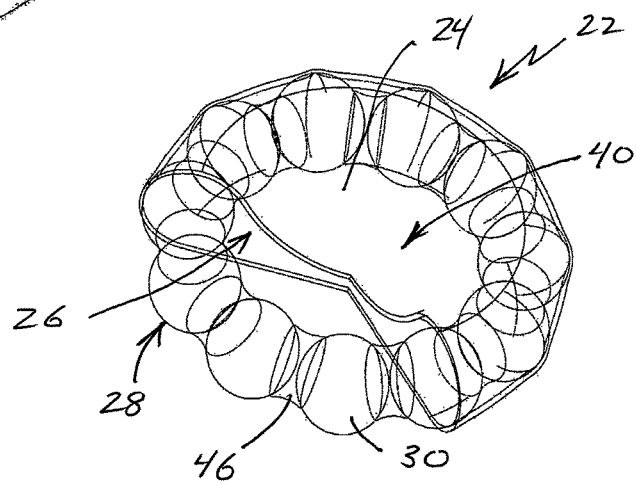
FIG. 7 is a top perspective view of the contact pad of FIG. 6 with the outer skin shown as transparent.
Figure 8:
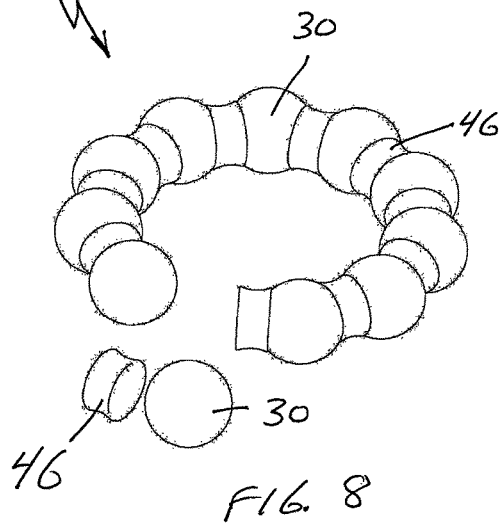
FIG. 8 is a top perspective view of the torus bearing of the contact pad of FIG. 6 with one of the bearings and separator shown separated from the torus bearing to better illustrate these components.

As set forth, the contact pad 22 has a torus bearing 28 disposed inside the pad chamber 26 thereof. The torus bearing 28 comprises a plurality of bearings 30 that are formed into a ring-like or toroidal shaped structure, as best shown in FIGS. 5-8 and 10-11. Each pair of adjacent bearings 30 are rotatably positioned together by a separator 46, best shown in FIGS. 6-8, that is configured to allow each adjacent bearing 30 to rotate independent of the other bearing 30. Although each of the bearings 30 rotate independently of the other bearings 30, the use of the separators 46 to form the bearings 28 into the torus bearing 28 allows the bearings 28 to function as a single unit inside the pad chamber 26 defined by the outer skin 24, as best shown in FIGS. 5-7. The fluid-filled interior of pad chamber 26, filled with liquid and/or compressed gas, allows the individual bearings 30 and the torus bearing 28 to rotate as the contact pad 22 moves across the surface 14. The outer skin 24 is a flexible, bladder-like skin that resembles an under-inflated ball, which enables the outer skin 24 of contact pad 22 to be held in a natural toroidal shape primarily by the down pressure of the load bearing assembly 48, an example of which is set forth in FIG. 9, acting on the bearings 30 and separators 46 of the torus bearing 28 inside pad chamber 26. The fluid, which can be a liquid, compressed gas or combination of liquid and compressed gas, inside the pad chamber 26 also aids in keeping the outer skin 24 of contact pad 22 in its generally toroidal shape. In one embodiment, the fluid inside pad chamber comprises oil and compressed gas. In another embodiment, the fluid inside pad chamber 26 is a very viscous liquid, which may provide some very slow flowing properties that are beneficial to the operation of the contact pad 22 of the present invention.

A wide variety of different materials can be utilized for the bearings 30 and separators 46. In one embodiment, smooth steel bearings 30 and smooth nylon separators 46 can be utilized for contact pad 22. Alternatively, both the bearings 30 and separators 46 can be made of metal, plastic, rubber and/or a variety of composite materials. As will be readily appreciated by persons skilled in the art, the bearings 30 and separators 46 can be allowed to deform to some degree to perform their respective functions. In fact, because the fluid inside the pad chamber 26, which can be a liquid such as oil and/or a pressurized gas, provides lubricity between the bearings 30, separators 46 and the outer skin 24 of the contact pad 22, there is considerable flexibility with regard to the materials chosen for the bearings, 30, separators 46 and outer skin 46.

Figure 9:
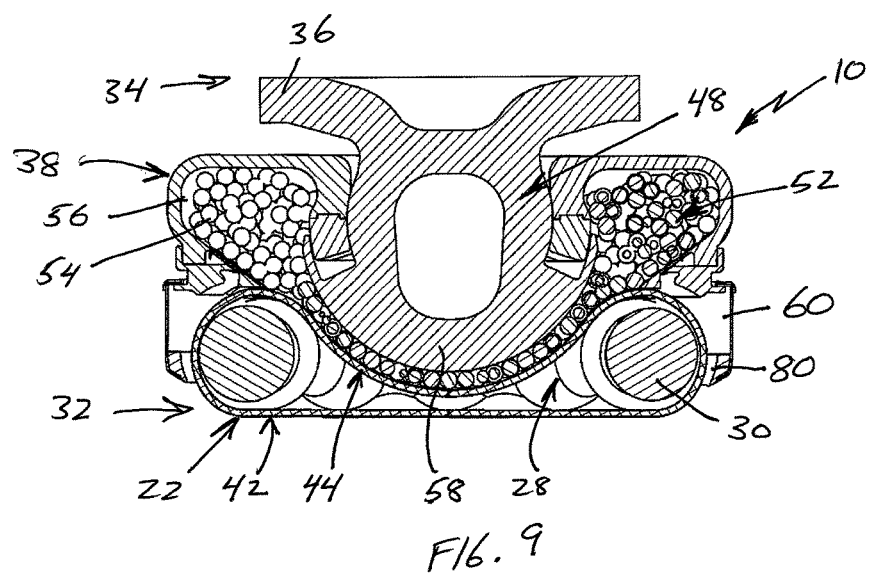
FIG. 9 is a cross-sectional side view of the embodiment of the wheel pad of FIG. 1 configured with a load base and ball bearing filled ball chamber as the load bearing assembly.
Figure 10:
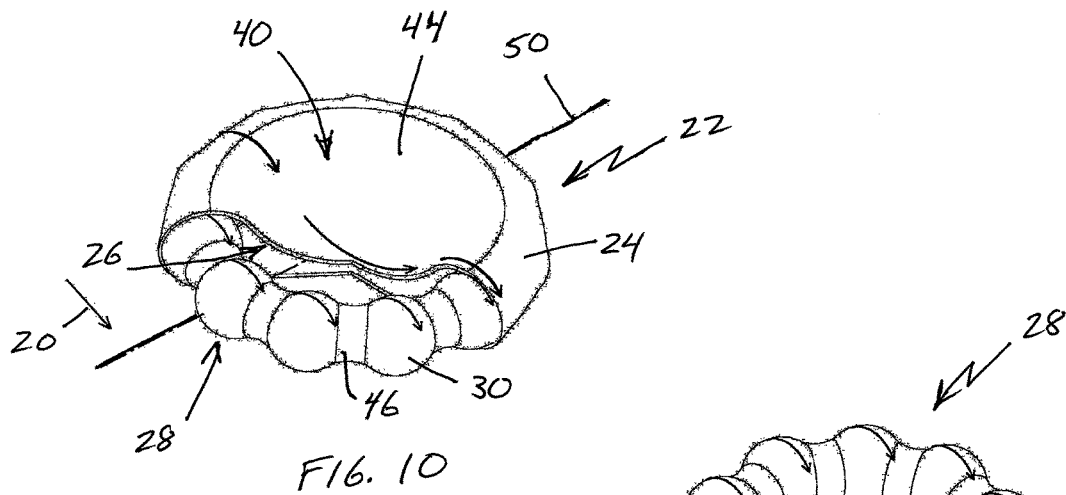
FIG. 10 is a top perspective view of the contact pad of FIG. 6 showing the rotational movement of the contact pad and torus bearing as a result of movement in a particular direction of travel.
Figure 11:
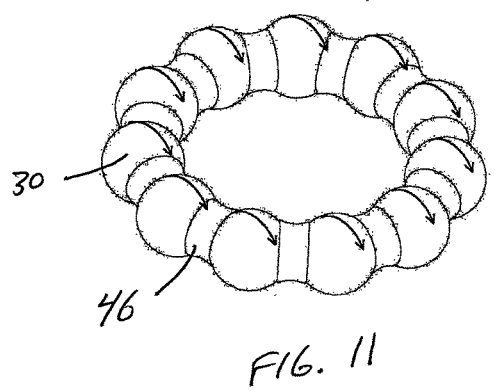
FIG. 11 is a top perspective view of the torus bearing of FIG. 10 showing the rotation of the individual bearings.

As illustrated by the example configuration of FIG. 9, the operation and configuration of which is described in detail below, the downwardly directed weight from the load bearing assembly 48 will deform the upper surface 40 of contact pad 22 to form the concave cavity 44 in which the load bearing assembly 48 is supported. The fluid and torus bearing 28 in the contact pad 22 will transfer the load, resulting from the weight of object 12 and frame 18, from the upper surface 40 thereof to the lower surface 42 in a manner that distributes the load substantially evenly across the lower surface 42 and which allows the contact pad 22 to move across the surface 14 in any direction which is desired, providing omnidirectional movement for wheel pad 10. FIGS. 10 and 11 show the resulting rotation of the torus bearing 28 inside the fluid-filled pad chamber 26 as a result of movement of contact pad 22 in the direction of travel 20. The contact pad 22 is urged toward any lateral direction of travel 20 from inside the concave cavity 44 formed on the upper surface 40 by a lateral force applied to the load bearing assembly 48 via the object 12 and/or frame 18. The direction of travel 20 shown in FIG. 10 results in the contact pad 22 having an axis of rotation, shown as 50, through the motion from the load bearing assembly 48 via the bearings 30 of the torus bearing 28. As shown in FIG. 10, the axis of rotation 50 of the contact pad 22 is approximately perpendicular to the direction of travel 20. As best shown in FIG. 11, the various individual bearings 30 of the torus bearing 28 will all rotate in the same direction with contact pad 22. As will be readily appreciated by those skilled in the art, because the fluid-filled contact pad 22 and bearings 30 all rotate in the same direction, the contact pad 22 will be able to instantaneously change direction without significant floor friction. In effect, the fluid-filled contact pad 22 behaves similar to a continuous miniature conveyor belt as it moves across the surface 14.

The contact pad 22 described above can be utilized with a variety of different configurations of wheel pad 10 that have differently configured load bearing assemblies 48 that transfer the load of object 12 and frame 18 to the contact pad 22. One such configuration of wheel pad 10 is illustrated in FIG. 9 and FIGS. 12-19 and is generally referred to as a Load Base Wheel Pad. As with the other embodiments, the load bearing assembly 48 comprises a load transfer mechanism 52 for transferring the load from connecting plate 36 at the upper end 34 of the wheel pad 10 to the above-described contact pad 22. As set forth in more detail below, the load transfer mechanism 52 of the wheel pad 10 of this embodiment comprises a plurality of recirculating bearings 54 that are contained in a ball chamber 56, defined by upper housing 38, that is sized and configured to allow the recirculating bearings 54 to move freely therein. This wheel pad 10 operates by circulating the recirculating bearings 54 over the fluid-filled contact pad 22. In addition to the load transfer mechanism 52, the load bearing assembly 48 of this embodiment also comprises a load transfer device, shown as load base 58 for this embodiment, that interconnects or is integral with connecting plate 36, as shown in FIGS. 12-15, which is connected to or integral with the frame 18 which supports object 12 (as shown in FIGS. 1 and 2) or directly connected to or integral with the object 12 itself. The load base 58 transfers the load from the connecting plate 36 to the contact pad 22 so the object 12 can be moveably supported above the surface 14 by the contact pad 22 of wheel pad 10.

Figure 12:
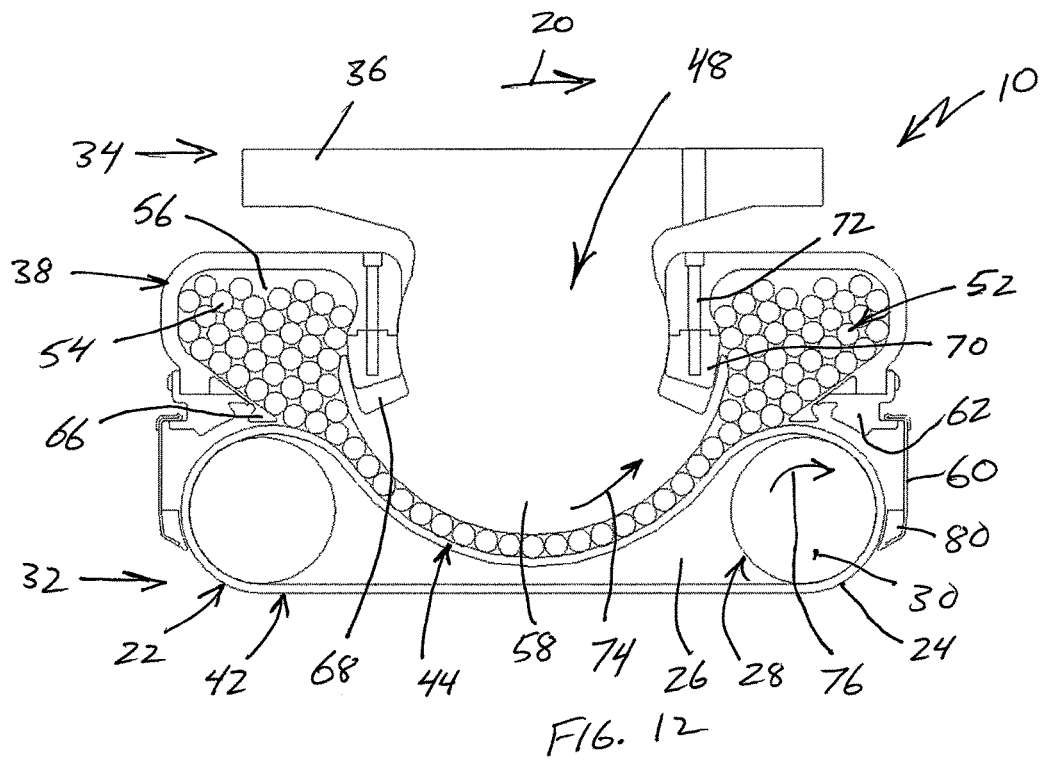
FIG. 12 is a cross-sectional side view first embodiment of the wheel pad of the present invention showing the load base configuration thereof.
Figure 13:
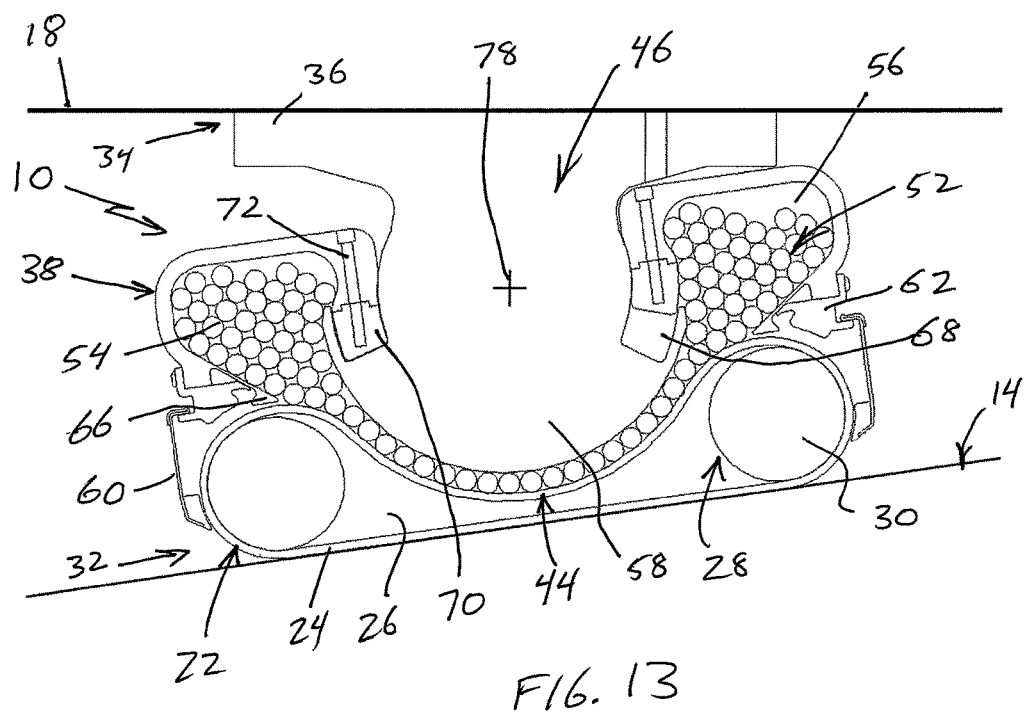
FIG. 13 is a cross-sectional side view of the wheel pad of FIG. 12 moving on an inclined surface.

The upper housing 38 connects to a retainer or shield 60 that is disposed around the contact pad 22, as also shown in FIGS. 12-15. The shield 60 is utilized to prevent material on the surface 14 from being pulled up into the ball chamber 56 by the movement of the outer skin 24 of the contact pad 22. A support ring 62 is annularly disposed about the wheel pad 10 to join the upper housing and the shield 60 substantially about the contact pad 22. A plurality of ring connectors 64, shown in FIG. 3, connect the support ring 62 to the lower end of the upper housing 38. The shield 60 tightly engages the support ring 62 below where it connects to the upper housing 38. As shown in FIGS. 12-15, a plurality of pliable fingers 66 extend downward from the outer edge of the upper housing 38 to close of the space between the contact pad 22 and the upper housing 38 to prevent any recirculating bearings 54 from moving outward between the contact pad 22 and the support ring 62. As best shown relative to FIGS. 12 and 13, the upper housing 38 and the load base 58 are cooperatively configured to allow the contact pad 22 to pivot relative to load base 58 below the recirculating bearings 54. The space between the load base 58 and the concave cavity 44 formed in upper surface 40 of the contact pad 22 further defines the ball chamber 56. In effect, the load base 58 floats above contact pad 22 on the recirculating bearings 54 as the contact pad 22 and the load transfer mechanism 52 pivot in response to a non-planar area 52, including an inclined area of surface 14, as shown in FIG. 13. In the embodiment shown in FIGS. 12-15, load base 58 has a slotted section 68 in which a portion of the upper housing 38 is directed, though not received therein. Instead, adjoining ring 70 is utilized to interconnect the upper housing 38 to the slotted section 68 and separate the ball chamber 56 from slotted section 68. In a preferred embodiment, the adjoining ring 70 and slotted section 68 are cooperatively configured to allow the adjoining ring 70 to extend into the slotted section 68 a sufficient distance to allow the contact pad 22 and upper housing 38, which together with the bottom of the load base 58 define the ball chamber 56 enclosing the recirculating bearings 54, to pivot relative to load base 58, which remains substantially vertically disposed above contact pad 22 even as it moves along an inclined area or other non-planar area 16 of the surface 14, as shown in FIG. 13. One or more, typically a plurality of, connecting elements 72 can be utilized to secure adjoining ring 70 to upper housing 38. In another embodiment, the adjoining ring 70 can be integral with this section of the upper housing 38.

As stated above, the load from the object 12 supported by frame 18 is directed downward by the load base 58 and transferred to the recirculating bearings 54 inside the ball chamber 56, to the contact pad 22 and then to surface 14, where the load is substantially evenly distributed over the bottom surface 42 of contact pad 22. The recirculating bearings 54 circulate inside ball chamber 56 as a result of the movement of the wheel pad 10 across surface 14. As shown in FIG. 12, the direction of travel 20 shown therein results in the recirculating bearings 54 in ball chamber 56 circulating in the ball bearing circulation direction 74 illustrated by the arrow and the contact pad 22 and bearings 30 rotate in the pad/bearing rotation direction 76 illustrated by the arrow. The load from object 12 and, as applicable, frame 18 is suspended up and off the bearings 30 by the fluid, typically oil and/or compressed gas, inside the pad chamber 26 of contact pad 22. Because the outer skin 24 of the contact pad 22 is reinforced, it will not stretch.

Figure 14:
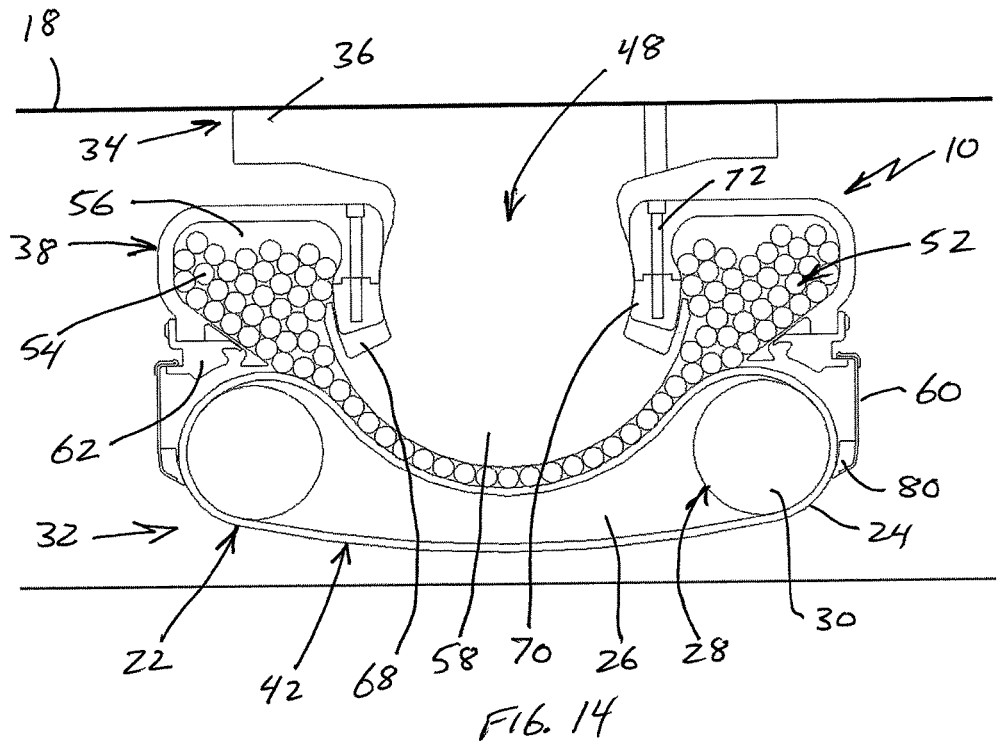
FIG. 14 is a cross-sectional side view of the wheel pad of FIG. 12 showing the wheel pad raised off of the surface.
Figure 15:
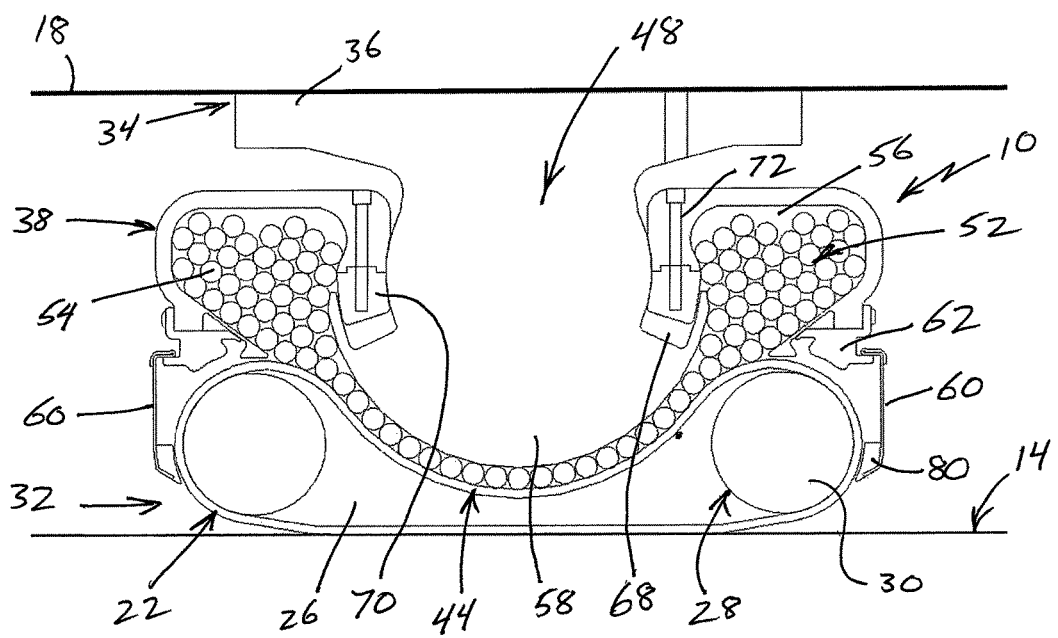
FIG. 15 is a cross-sectional side view of the wheel pad of FIG. 12 showing use of a compressed gas charge in the pad chamber to provide a cushioning effect for the torus bearing.
Figure 16:
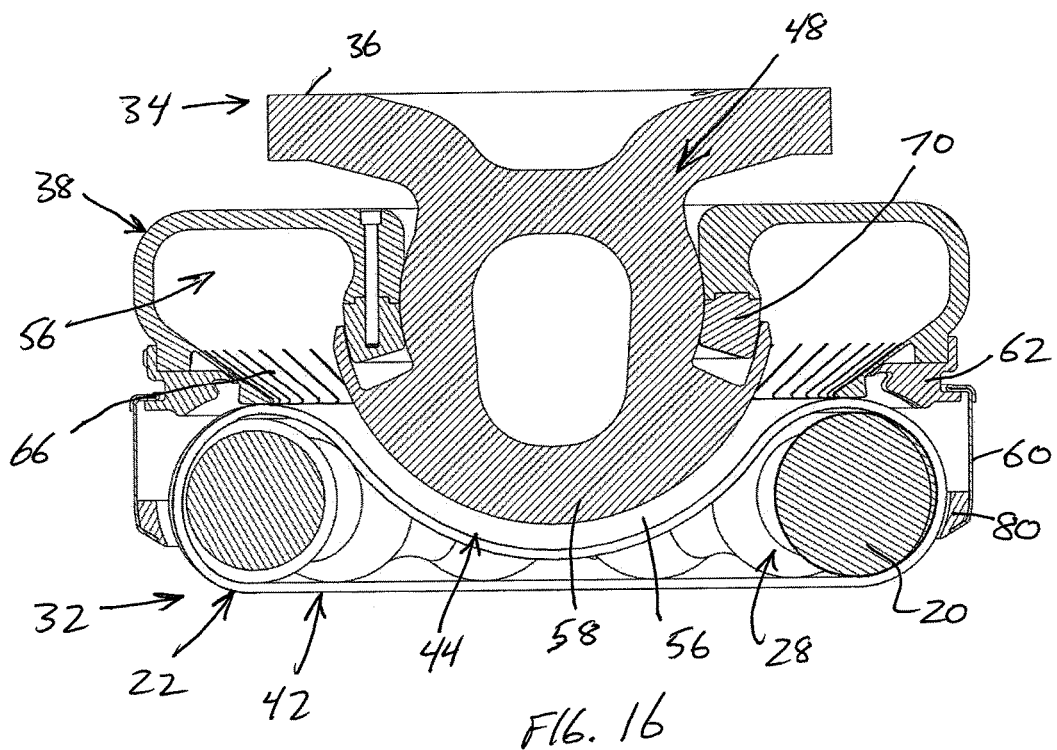
FIG. 16 is a cross-sectional side view of the wheel pad of FIG. 12 without the recirculating bearings to better illustrate the ball chamber and the pliable fingers separating the ball chamber from the contact pad.
Figure 17:
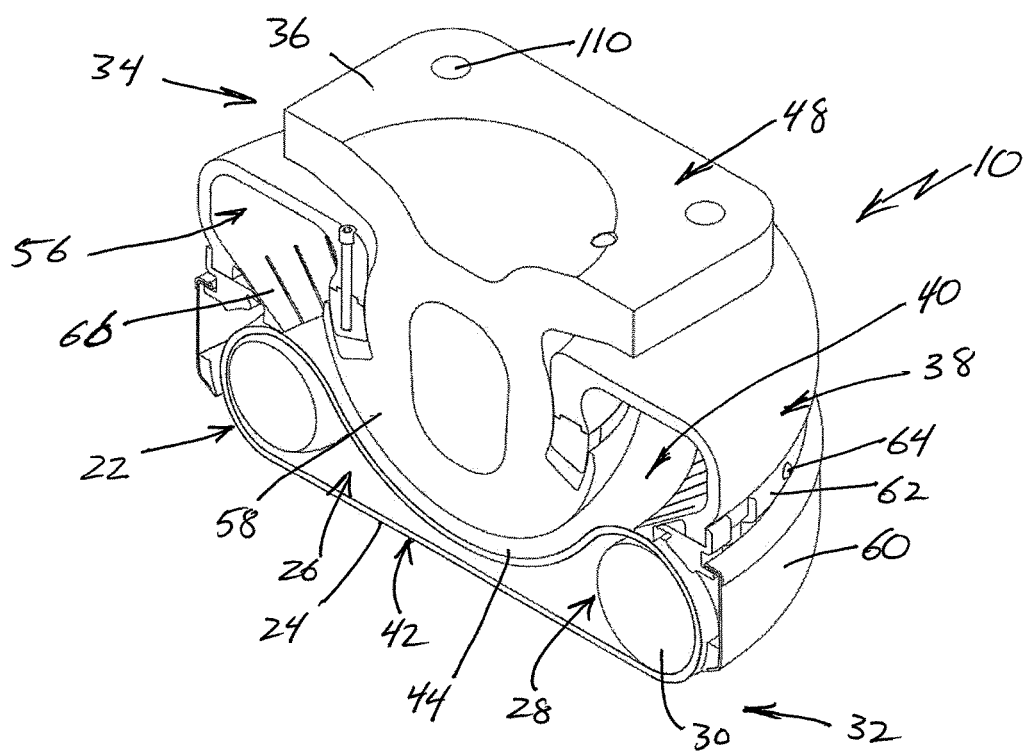
FIG. 17 is a side perspective view of the wheel pad of FIG. 16.

As stated above, FIG. 13 shows the wheel pad 10 moving along an inclined area of surface 14. Contact pad 22 and ball chamber 56 swivel around the same approximate center, shown as 78, to stay aligned with the surface 14 and maintain the object 12 and, if utilized, frame 18 in a substantially level configuration. As such, the wheel pad 10 will maintain normal operation with regard to moving the object 12 in changing conditions of the surface 14. FIG. 14 shows wheel pad 10 when it is raised up off the surface 14. As shown, the lower end shield 60 can comprise a holder element 80, such as rubber, plastic or metal member, that presses against the outer skin 24 of contact pad 22 when it moves downward to prevent contact pad 22 from fully disengaging or separating from the upper housing 38, ball chamber 56 and load base 58, which would cause the recirculating bearings 54 in the ball chamber 56 to exit the wheel pad 10 onto the surface 14. When engaged, the holder element 80 grips contact pad 22 slightly below the widest outer circumference of the contact pad 22. A light charge of compressed gas inside the pad chamber 26 of contact pad 22 keeps pressure on the recirculating bearings 54 when the wheel pad 22 is elevated off of the surface 14. Maintaining pressure on the recirculating bearings 54 keeps the recirculating bearings 54 from bunching up under the load base 58 and keeps the wheel pad 10 from swiveling around and banging against the various stop surfaces disposed therein. FIG. 15 illustrates the effect of utilizing a certain mix, which will depend on various factors with regard to the wheel pad 10, of liquid, such as oil, and compressed gas is present inside the pad chamber 26. As shown, the mix of fluid can elevate the bearings 30 up and away from where the lower surface 42 contacts the surface 14, providing the contact pad 22 with a better cushion and floatation effect. FIG. 16 illustrates the wheel pad 10 of the above embodiment with the recirculating bearings 54 removed from the ball chamber 56 to better illustrate the ball chamber 56, the pliable fingers 66 and the relationship between the ball chamber 56 and the contact pad 22. As shown, the upper housing 38 that defines the ball chamber 56 clears contact pad 22 with sufficient clearance that in normal operation the upper housing 38 and ball chamber 56 causes little to no resistance to the movement of wheel pad 10. Due to the configuration of wheel pad 10, this same clearance is maintained through the range of the wheel pad's articulation. The pliable fingers 66, best illustrated in FIG. 17 (which also shows the wheel pad 10 without the recirculating bearings 54 in ball chamber 56), are utilized to allow individual bearings 30 of the torus bearing 28 to rise up over any non-planar areas 16, such as objects on the surface 14, without causing any binding interference between the contact pad 22 and the rim of the upper housing 38 that defines the ball chamber 56.

Figure 18:
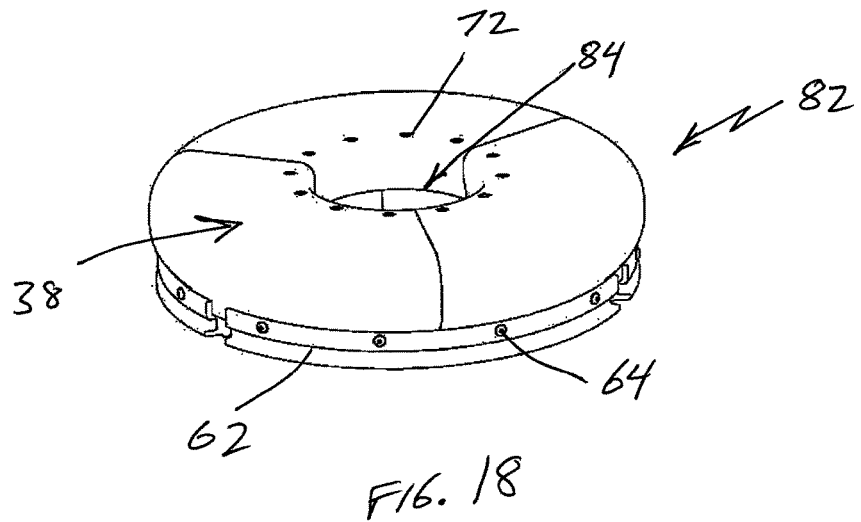
FIG. 18 is a top perspective view of a complete ball chamber assembly utilized with the wheel pad of FIG. 12.
Figure 19:
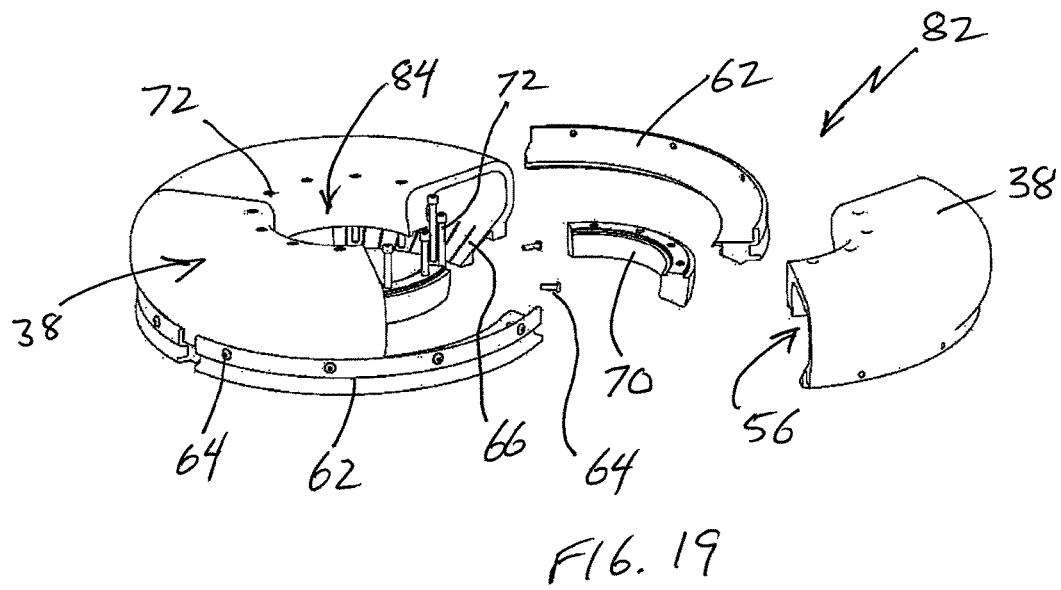
FIG. 19 is a top perspective view of the ball chamber assembly of FIG. 18 shown partially disassembled.

As will be appreciated from the above, the upper housing 38 and adjoining ring 70 comprise a ball chamber assembly 82 that defines the upper boundaries of the ball chamber 56, with the lower boundaries thereof being defined by the contact pad 22. FIG. 18 illustrates a complete ball chamber assembly 82. As shown therein, the ball chamber assembly 82 is generally toroidal shaped with the center portion 84 thereof being open to contain the load base 58, as shown in FIGS. 12-17. FIG. 19 illustrates the same ball chamber assembly 82, but with the ball chamber assembly 82 partially disassembled to better illustrate the components thereof, particularly the ball chamber 56, pliable fingers 66 and adjoining ring 70 which, as interior components, are not shown in FIG. 18. As shown in these figures, the components of ball chamber assembly 82 are relatively easy to assemble during the manufacturing of wheel pad 10 and can be easily and practically disassembled, as needed, for servicing in the event of an accident or damage to wheel pad 10.

Figure 20:
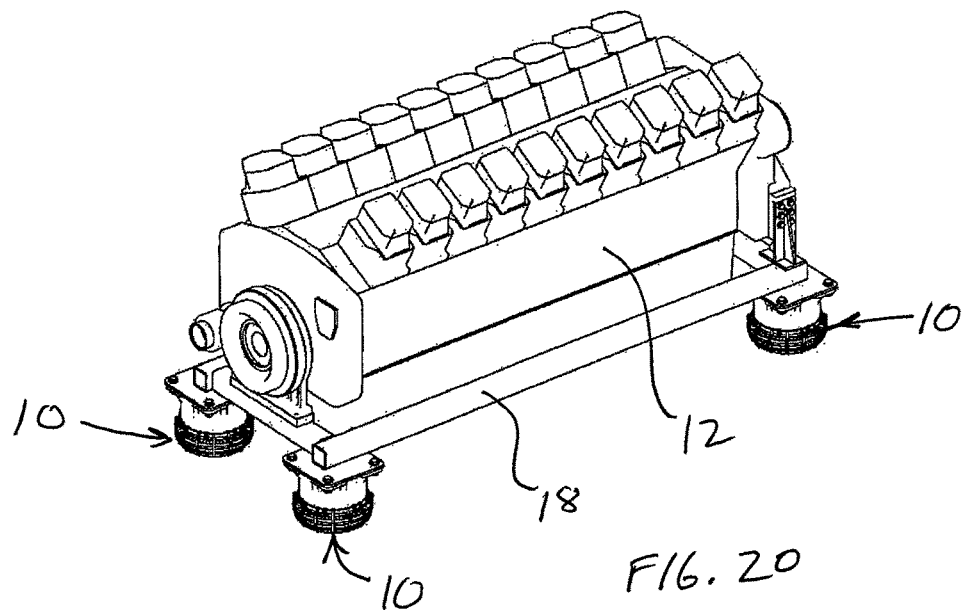
FIG. 20 is a side perspective view of an engine supported by a frame being moved across a surface having a non-planar area by a plurality of wheel pads configured according to a second embodiment of the present invention.
Figure 21:
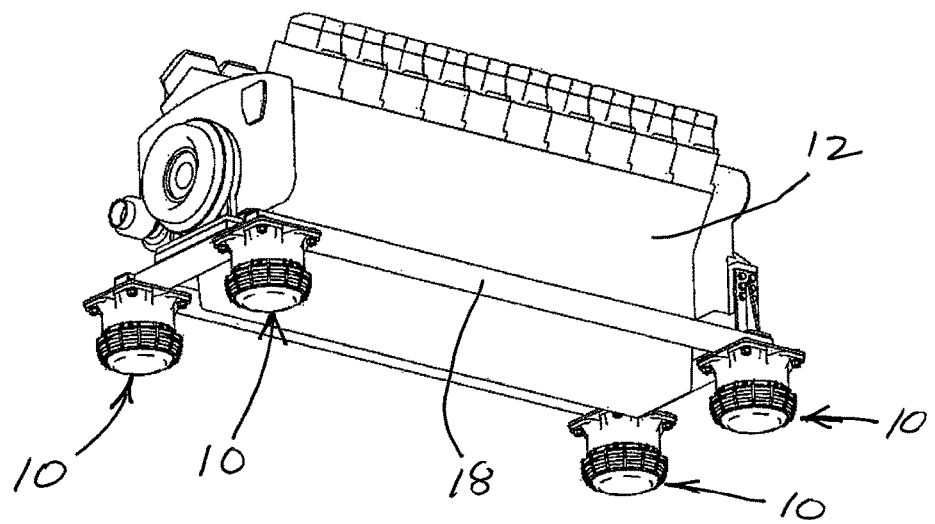
FIG. 21 is a bottom perspective view of the engine, frame and wheel pads of FIG. 20 showing the wheel pads mounted to the frame.
Figure 22:
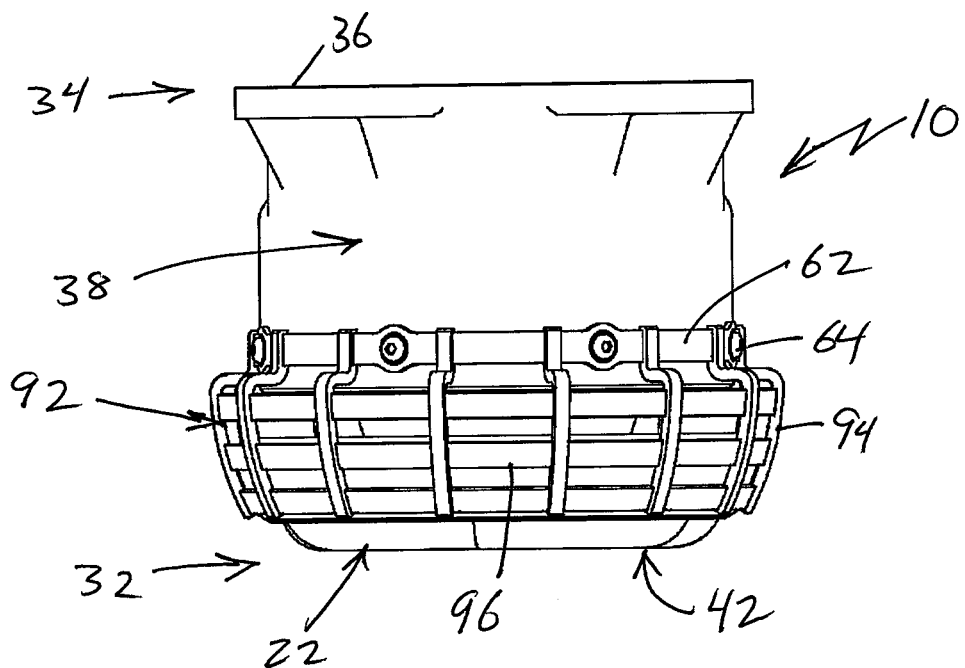
FIG. 22 is a side view of a wheel pad configured according to the principles and concepts of the second embodiment of the present invention showing the ball transfer wheel pad assembly.
Figure 23:
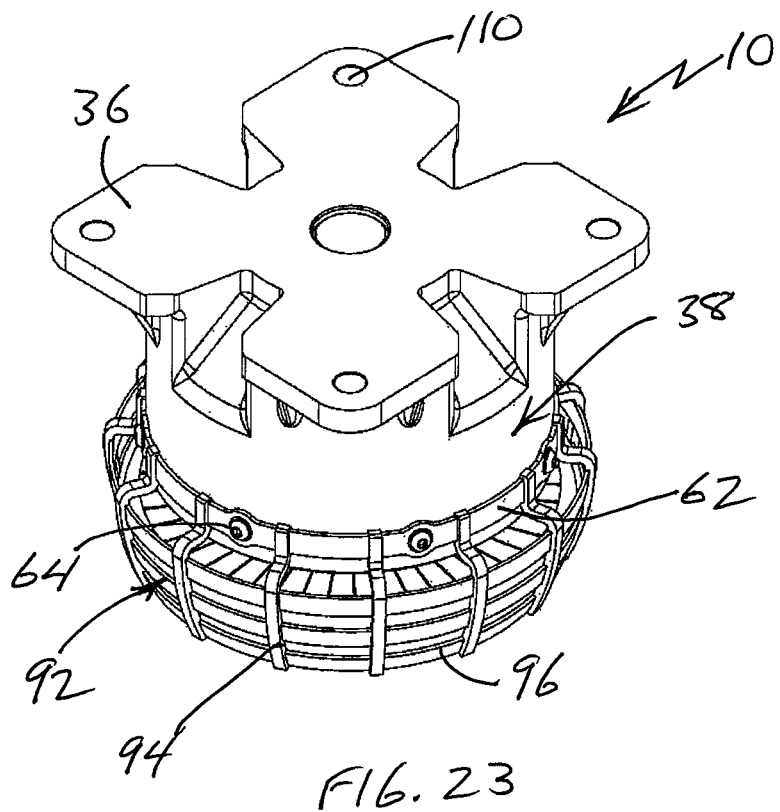
FIG. 23 is a top perspective view of the wheel pad of FIG. 22.
Figure 24:
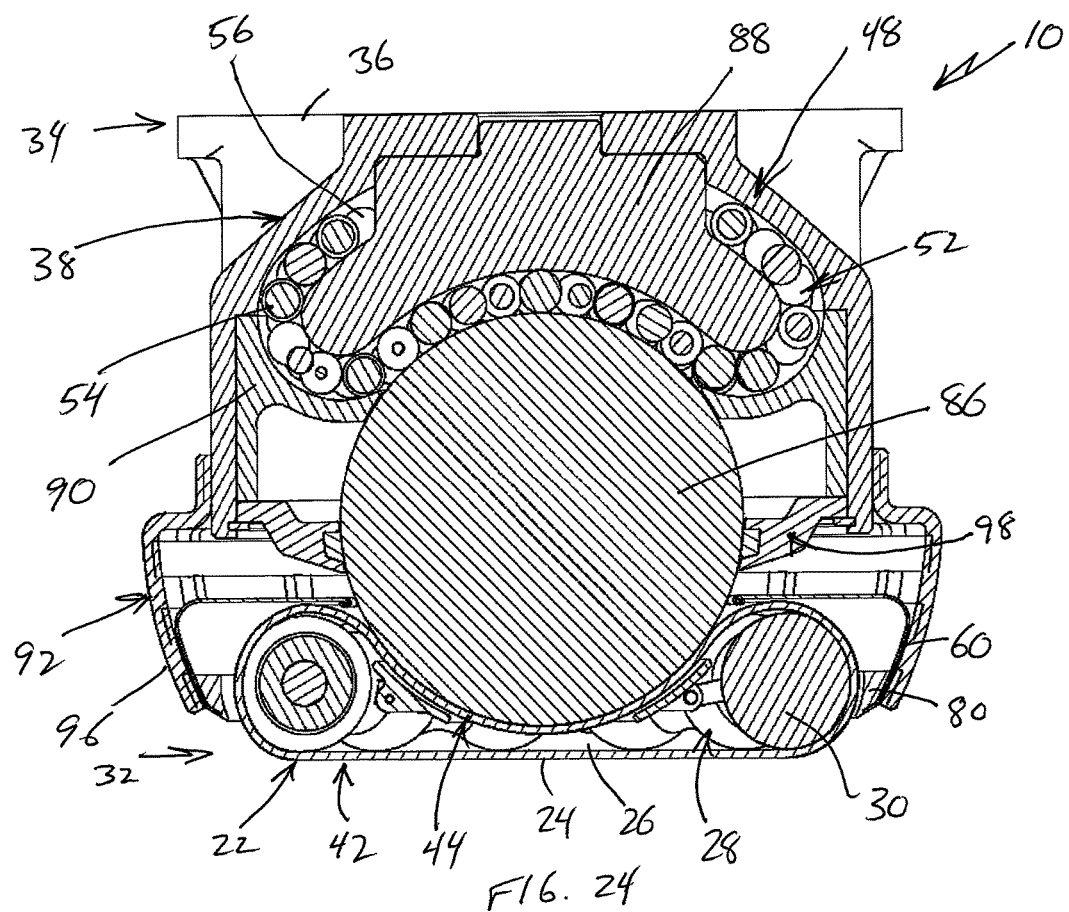
FIG. 24 is a cross-sectional side view of the embodiment of the wheel pad of FIG. 22.

A second embodiment of the wheel pad 10 of the present invention is shown in FIGS. 20-24. This embodiment, generally referred to as a Ball Transfer Wheel Pad, is shown in use attached to frame 18 to move an object 12, such as the engine shown in FIGS. 20 and 21, across a surface 14 which may have a non-planar area 16 in its direction of travel 20 that it must cross, as shown in FIG. 20. The wheel pad 10 of this embodiment is configured much the same as the wheel pad 10 of the above-described embodiment, utilizing the contact pad 22 described above and, although configured differently, a load bearing assembly 48 having a load transfer mechanism 52 comprising a plurality of recirculating bearings 54 disposed in a ball chamber 56, as shown in FIG. 24. The primary difference with this embodiment is that instead of using a load base 58 that applies a downward force onto the load transfer mechanism 52 between it and the concave cavity 44 at the upper surface 40 of the contact pad 22, the embodiment of FIGS. 20-24 utilizes a relatively large sized load ball 86 (as the load transfer device) disposed directly onto the concave cavity 44 and places the load transfer mechanism 52 between it and an upper load transfer member 88 toward the upper end 34 of the wheel pad 10, as best shown in FIG. 24. As with the previous embodiment, the contact pad 22 is located at the lower end 32 of wheel pad 10 such that the lower surface 42 thereof contacts and moves across surface 14. The round load ball 86 is free to rotate on in the concave cavity 44 on the upper surface 40 of the contact pad 22. As with the above embodiment, the load transfer mechanism 52 comprises a plurality of recirculating bearings 54 disposed in a ball chamber 56. In this embodiment, the ball chamber 56 is defined by upper housing 38, load ball 86, upper load transfer member 88 and a lower load transfer member 90, with the recirculating bearings 54 free to move inside the ball chamber 56 and in direct contact with the upper surface, which rotates, of the load ball 86, as best shown in FIG. 24. As with the above embodiment, a retainer 60 with a holder element 80 is positioned around the contact pad 22. However, due in part to the size and position of the load ball 86, a separate clamping assembly 92 is utilized to secure the contact pad 22, with the shield 60 around contact pad 22, to upper housing 38, as best shown in FIGS. 22-23. Clamping assembly 92 comprises a plurality of clamp members 94 that interconnect the outer cover 96 and the support ring 62 that attaches to upper housing 38 with ring connectors 64. In addition to joining the wheel pad 10 together, the outer cover 96 helps protect the contact pad 22 from damage.

The embodiment of FIGS. 20-24 also utilizes a load ball retainer 98 that functions to hold the load ball 86 in position above the contact pad 22 and to prevent entry of debris from surface 14 into the area around the load ball 86 and to keep erosion of the surface of the load ball 86 to a minimum. In fact, this is one of the primary benefits of the configuration of wheel pad 10 of FIGS. 20-24. It provides a wheel pad 10 having greater tolerance of debris, sticky materials and other contamination found on floors, sidewalks, driveways, loading ramps and other surfaces 14, whether indoors or outdoors. With the configuration of this embodiment, the wheel pad 10 can travel over "soft" surfaces 14, including lawns and gravel, as well as smooth and clean surfaces 14.

Figure 25:
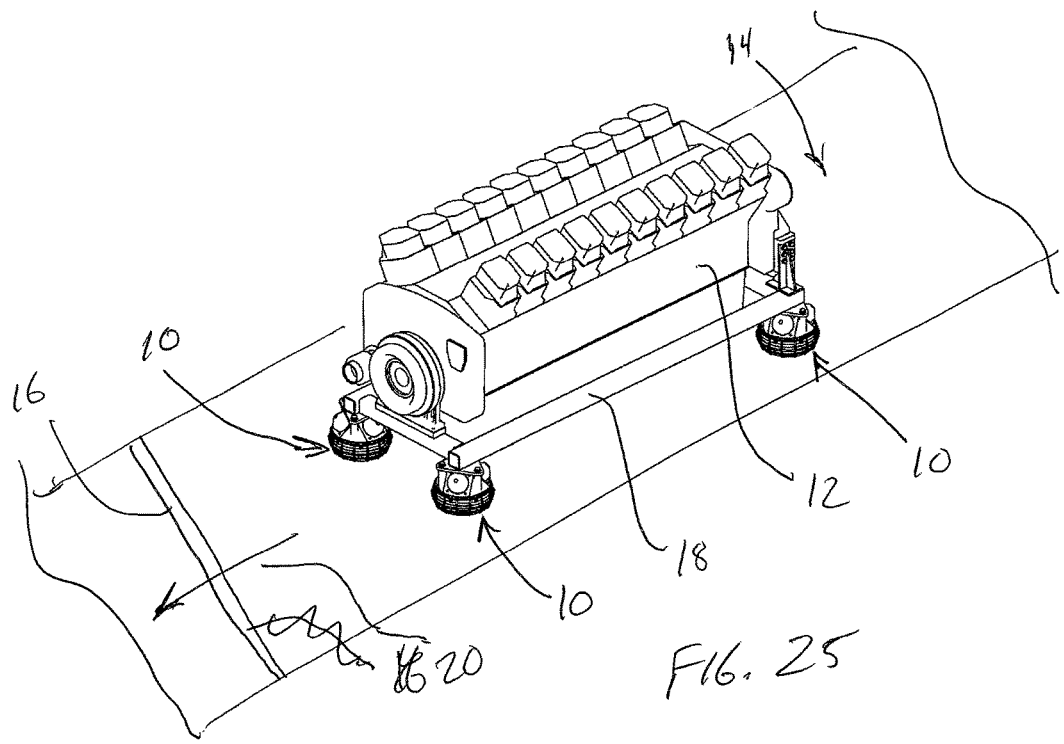
FIG. 25 is a side perspective view of an engine supported by a frame being moved across a surface having a non-planar area by a plurality of wheel pads configured according to a third embodiment of the present invention.
Figure 26:
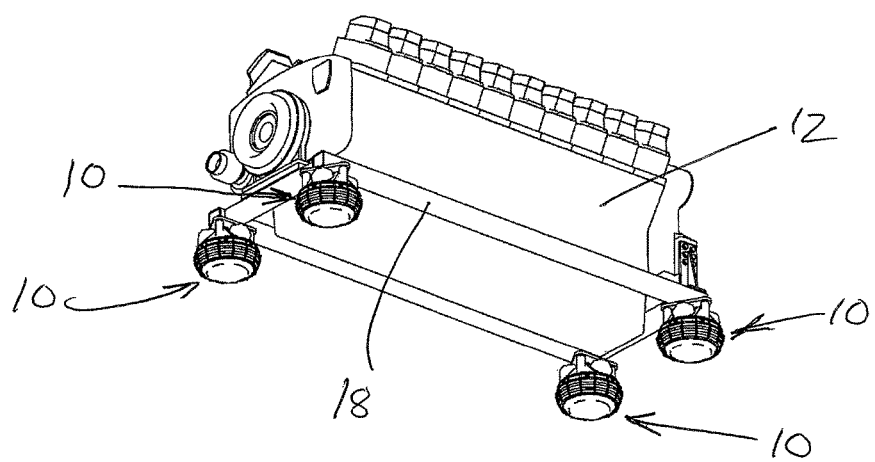
FIG. 26 is a bottom perspective view of the engine, frame and wheel pads of FIG. 25 showing the wheel pads mounted to the frame.
Figure 27:
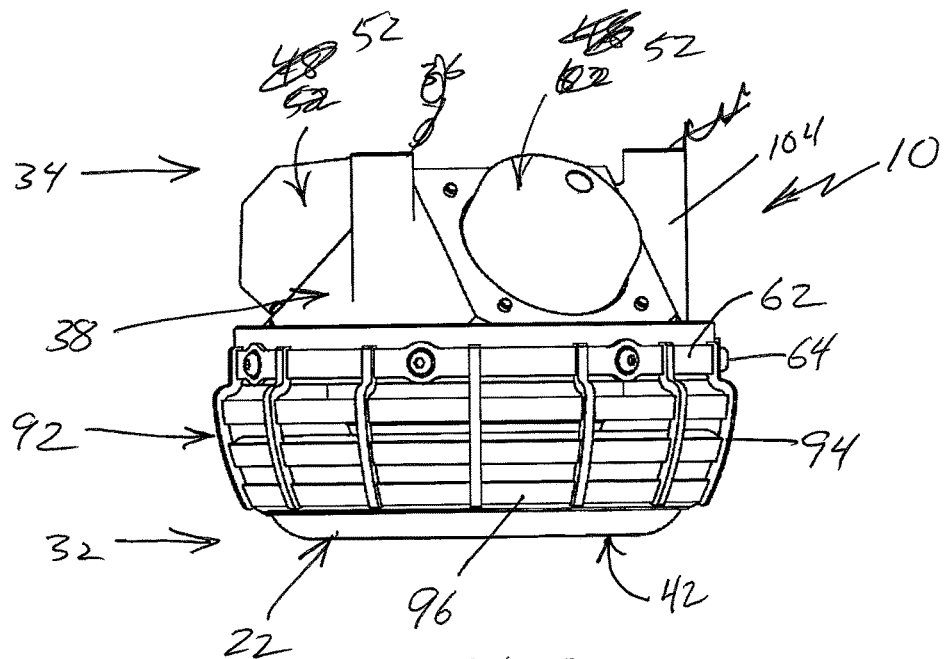
FIG. 27 is a side view of a wheel pad configured according to the principles and concepts of the third embodiment of the present invention showing the ball transfer wheel pad assembly.
Figure 28:
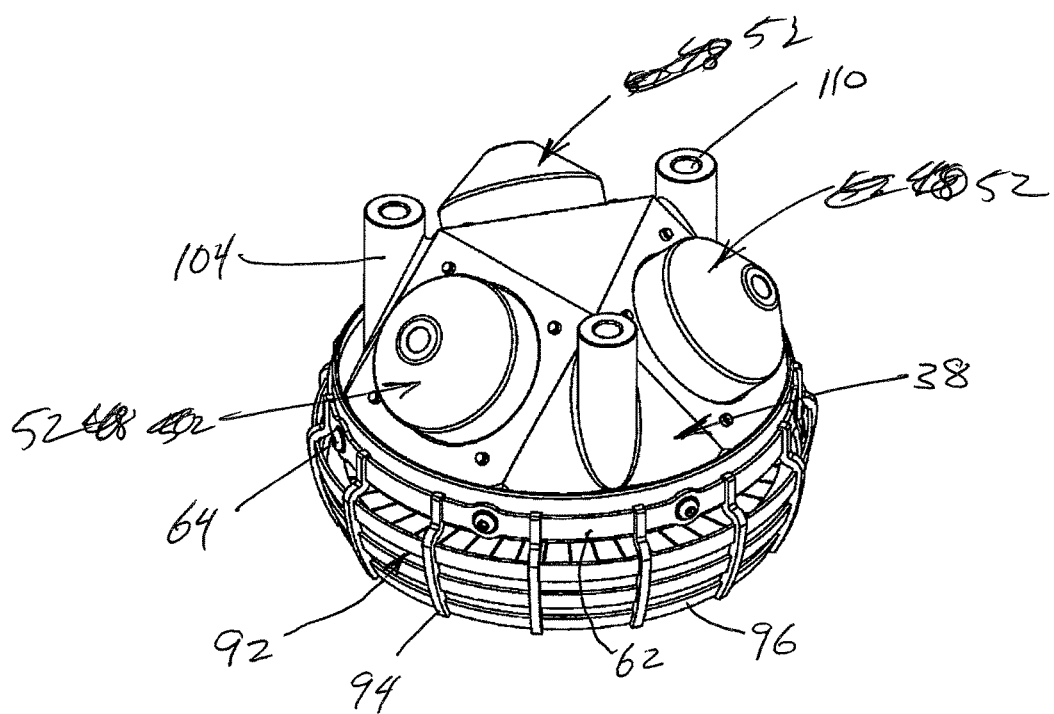
FIG. 28 is a top perspective view of the wheel pad of FIG. 27.
Figure 29:
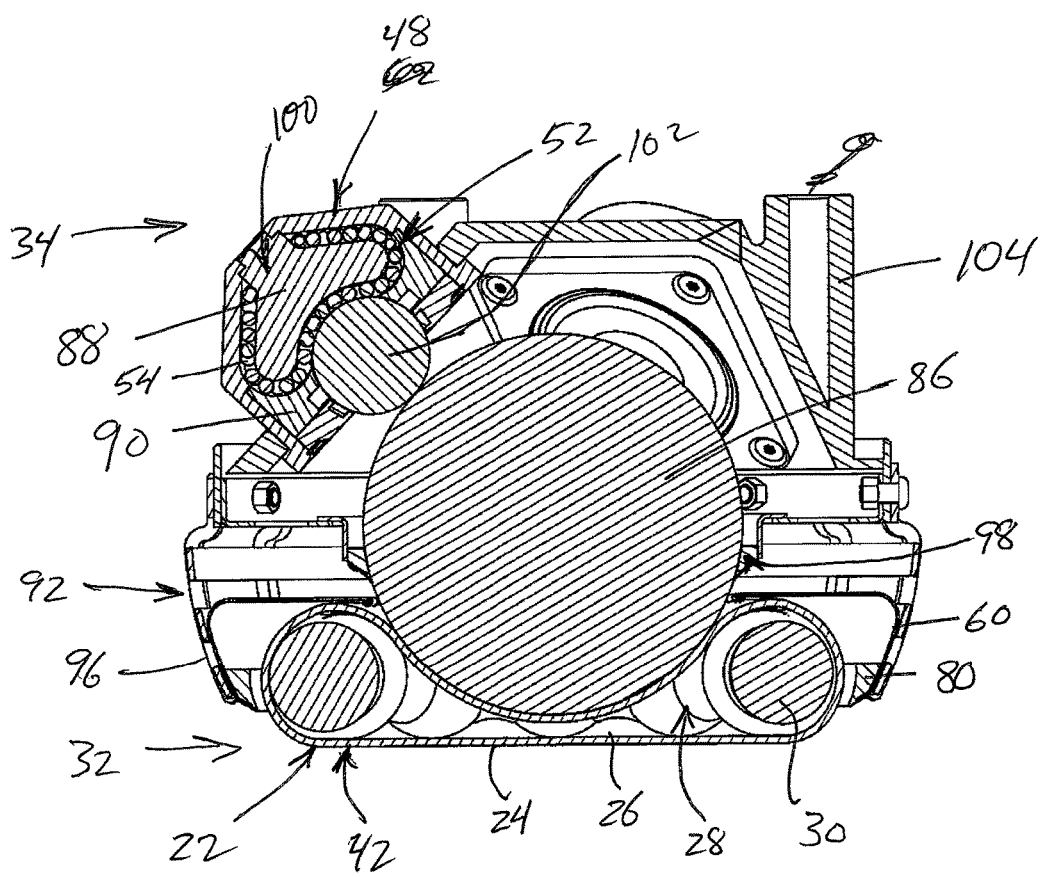
FIG. 29 is a cross-sectional side view of the embodiment of the wheel pad of FIG. 27.
Figure 30:
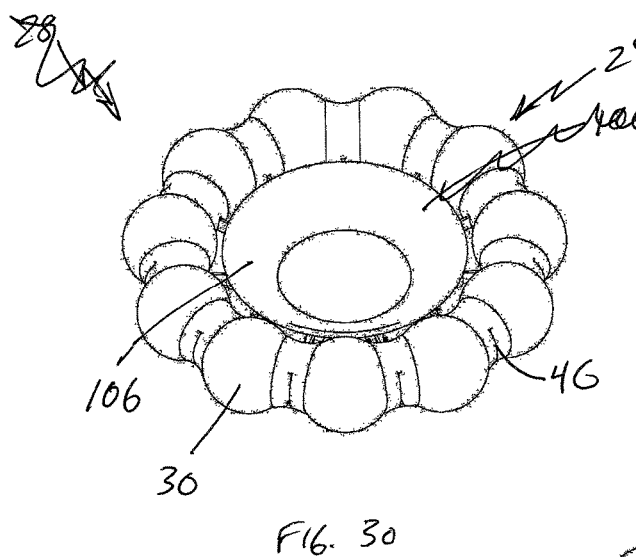
FIG. 30 is a top perspective view of a alternative embodiment of the contact pad showing use of a centering ring.
Figure 31:
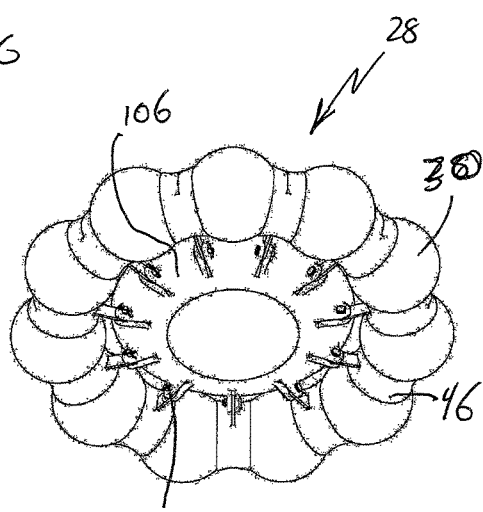
FIG. 31 is a bottom perspective view of the contact pad of FIG. 30.
Figure 32:
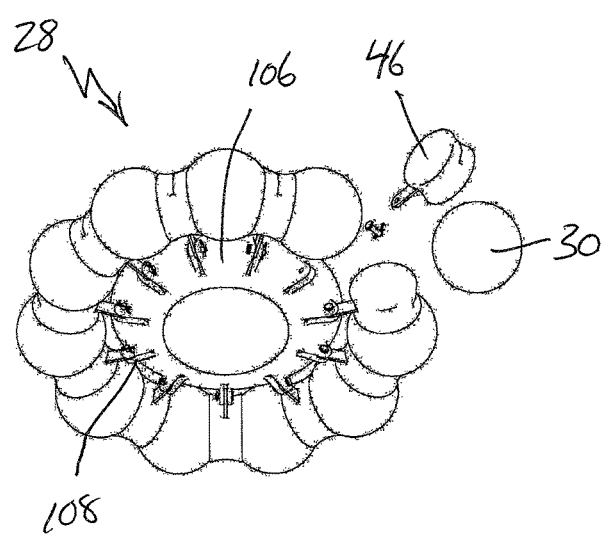
FIG. 32 is a bottom perspective view of the contact pad of FIG. 30 showing one of the bearings and separators removed therefrom.
Figure 33:
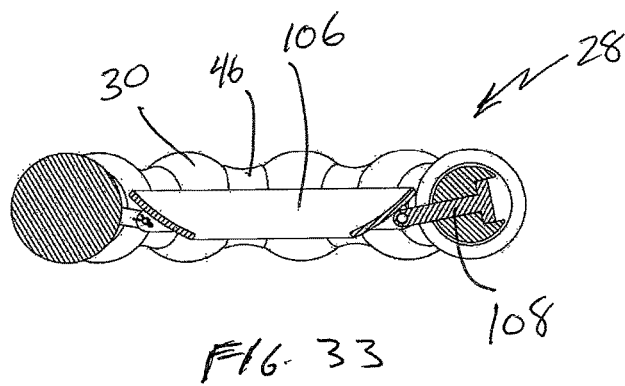
FIG. 33 is a cross-sectional side view of the contact pad of FIG. 30.
Figure 34:
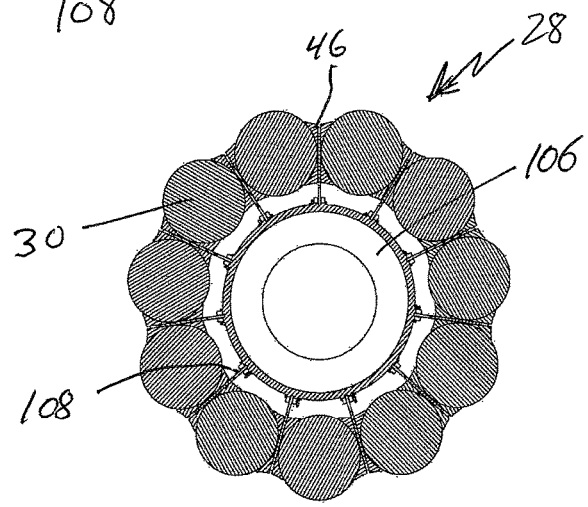
FIG. 34 is a cross-sectional top view of the contact pad of FIG. 30.

A third embodiment of the wheel pad 10 of the present invention is shown in FIGS. 25-29. This embodiment, generally referred to as a Load Ball Wheel Pad, is shown in use attached to frame 18 to move an object 12, such as the engine shown in FIGS. 25 and 26, across a surface 14 which may have a non-planar area 16 in its direction of travel 20 that it must cross, as shown in FIG. 25. The wheel pad 10 of this embodiment is configured much the same as the wheel pad 10 of the above-described embodiments, utilizing the contact pad 22 described above and, although configured differently, a load bearing assembly 48 having a load transfer mechanism 52, as shown in FIG. 29. A primary difference with this embodiment is that the load bearing assembly 48 utilizes three smaller ball transfer units 100, each with their own set of recirculating bearings 54 in a ball chamber 56, as the load transfer mechanism 52, as best shown in FIGS. 27 and 28, instead of a single load transfer mechanism 52 of the embodiment of FIGS. 20-24. Each of the ball transfer units 100 are in rotating engagement with load ball 86 to transfer the load to contact pad 22 that is in contact with and which moves across surface 14. The ball transfer units 100 of this embodiment are generally configured as smaller versions of the load ball assembly shown in FIG. 24 and described above, with each of the ball chambers 56 thereof being defined by an upper 88 and lower 90 load transfer member. The recirculating bearings 54 in the ball chambers 56 are in contact with a secondary load ball 102 of the ball transfer unit 100 such that the load from object 12 and frame 18 is transferred to the secondary load ball 102, as shown in FIG. 29. As also shown in this figure, the secondary load ball 102 of the ball transfer units 100 then transfers the load to the load ball 86, which rotates in concave cavity 44 against the upper surface 40 of the contact pad 22. The embodiment of FIGS. 25-29 also utilizes a plurality of connecting posts 104 to connect to the load 12 or frame 18, either directly or indirectly utilizing a separate connecting plate.

Figure 35:
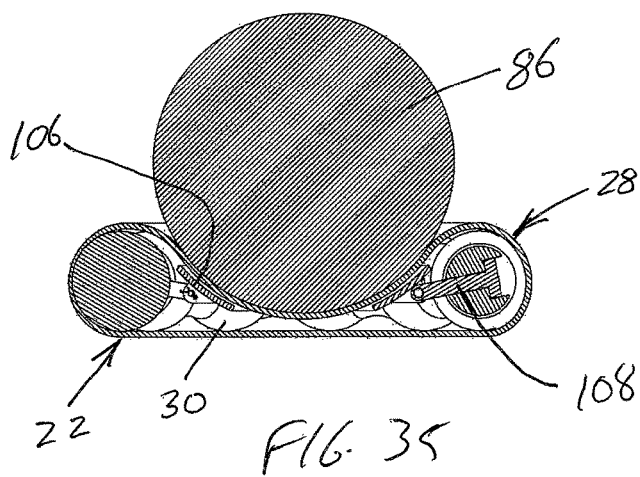
FIG. 35 is a cross-sectional side view of a portion of the wheel pad of FIG. 24 showing the use of the centering ring therewith.

In an alternative embodiment, the tours bearing 28 can also comprise a centering ring 106, shown in FIGS. 30-35, that augments the tours bearing 28 described above by protecting the outer skin 24 of the contact pad 22 from damage. As best shown in FIG. 35, the centering ring 106 contains relative lateral movement of the load ball 86 and maintains a space between the contact pad 22 and the individual bearings 30 of the torus bearing 28. In addition, the centering ring 106 is configured to maintain a space between itself and the outer skin 24 of the contact pad 22 when not containing relative lateral movement. However, the centering ring 106 does not provide load support. The centering ring 106 is held in place by a bracket 108 that connects to the separators 46 of torus bearing 28, as best shown in FIGS. 31-33 and 35. While it is anticipated that the design of the wheel pad 10 will naturally maintain the lateral spacing shown in the figures, the centering ring 106 provides added assurance the outer skin 24 of the contact pad 22 is not pinched between the load ball 86 or the recirculating bearings 54 and the individual bearings 30 of the torus bearing 28 during vigorous usage of wheel pad 10. The favorable thrust dynamics of the design of the wheel pad 10 and lubrication by the fluid inside the pad chamber 26 is expected to make the occasional friction between the outer skin 24 of the contact pad 22 and the centering ring 106 a non-issue.

As set forth above, the wheel pad 10 of the present invention is very versatile with regard to the configuration that may be necessary to move very large and heavy objects 12. The wheel pad 10 can connect to the object 12 or frame 18 using bolts, screws or other connectors that connect to the mounting locations 110 shown in FIGS. 3, 17, 23 and 28.

Although there is shown and described herein a specific form of the invention, it will be readily apparent to individuals skilled in the art that the present invention is not so limited, but is susceptible to numerous modifications and rearrangements in design and materials without departing from the spirit and scope of the invention. In particular, it should be noted that the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

What is claimed is:

1. A wheel pad for moving an object across a surface, said wheel pad comprising:
    a contact pad having an outer skin defining an upper surface, a lower surface and a pad chamber disposed therebetween in which is enclosed a fluid and a torus bearing, said torus bearing having a plurality of adjacent bearings, each of said adjacent bearing being rotatably joined by a separator structured and arranged to allow each of said bearings to independently rotate in said pad chamber, said contact pad defining a lower end of said wheel pad;
    a load bearing assembly comprising a load transfer mechanism and a load transfer device, said load transfer mechanism having a plurality of recirculating bearings moveably disposed in a ball chamber, said load transfer device structured and arranged to move independent of said load transfer mechanism while transferring the weight of the object from at or near an upper end of said wheel pad to said upper surface of said contact pad;
    a housing positioned above said upper surface of said contact pad, said housing structured and arranged to enclose said load bearing assembly; and
    a clamping assembly having a plurality of clamping members that secure said contact pad to said housing, wherein said fluid and said torus bearing in said contact pad will transfer the weight of the object from said upper surface of said contact pad to said lower surface of said contact pad so as to distribute the weight of the object substantially evenly across said lower surface of said contact pad to provide omnidirectional movement for said wheel pad across the surface as a result of lateral forces applied to said load bearing assembly.

2. The wheel pad of claim 1, wherein said outer skin of said upper surface is configured to define a concave-shaped cavity, said concave-shaped cavity cooperatively sized and configured with said load transfer device so as to receive said load transfer device therein.

3. The wheel pad of claim 2, wherein said load transfer device is a round load ball.

4. The wheel pad of claim 1 further comprising a connecting plate attached to or integral with said housing, said connecting plate attached to or integral with said object.

5. The wheel pad of claim 4 further comprising a retainer attached to or integral with said housing, said retainer partially disposed around said contact pad to prevent damage to contact pad as said wheel pad moves across the surface.

6. The wheel pad of claim 1, wherein said load bearing assembly further comprises an upper load transfer member and a lower load transfer member disposed in said housing above said upper surface of said contact pad, said upper load transfer member disposed in spaced apart relation to said lower load transfer member, said ball chamber defined by said housing, said upper transfer member, said lower transfer member and said load transfer device.

7. The wheel pad of claim 6, wherein at least one of said housing and said upper transfer member is attached to or integral with the object and said load transfer mechanism is structured and arranged to allow said load bearing assembly to pivot relative to said contact pad.

8. The wheel pad of claim 1, wherein said load transfer device is a round load ball, said load ball sized and configured to interconnect said upper surface of said contact pad and said load transfer mechanism with said ball chamber disposed therebetween so as to allow movement of said load transfer mechanism relative to said load ball.

9. A wheel pad for moving an object across a surface, said wheel pad comprising:
    a contact pad having an outer skin defining an upper surface, a lower surface and a pad chamber disposed therebetween in which is enclosed a fluid and a torus bearing, said outer skin of said upper surface configured to define a concave-shaped cavity, said torus bearing having a plurality of adjacent bearings, each of said adjacent bearing being rotatably joined by a separator structured and arranged to allow each of said bearings to independently rotate in said pad chamber, said contact pad defining a lower end of said wheel pad;
    a housing positioned above said upper surface of said contact pad;
    a clamping assembly having a plurality of clamping members that secure said contact pad to said housing; and
    a load bearing assembly enclosed by said housing, said load bearing assembly comprising a load transfer mechanism and a load transfer device, said load transfer mechanism having a plurality of recirculating bearings moveably disposed in a ball chamber, said load transfer device structured and arranged to move independent of said load transfer mechanism while transferring the weight of the object from at or near an upper end of said wheel pad to said upper surface of said contact pad, said load transfer device sized and configured to be received in said concave-shaped cavity,
wherein said fluid and said torus bearing in said contact pad will transfer the weight of the object from said upper surface of said contact pad to said lower surface of said contact pad so as to distribute the weight of the object substantially evenly across said lower surface of said contact pad to provide omnidirectional movement for said wheel pad across the surface as a result of lateral forces applied to said load bearing assembly.

10. The wheel pad of claim 9, wherein said load transfer device is a round load ball.

11. The wheel pad of claim 9 further comprising a connecting plate attached to or integral with said housing, said connecting plate attached to or integral with said object.

12. The wheel pad of claim 9 further comprising a retainer attached to or integral with said housing, said retainer partially disposed around said contact pad to prevent damage to contact pad as said wheel pad moves across the surface.

13. The wheel pad of claim 9, wherein said load bearing assembly further comprises an upper load transfer member and a lower load transfer member disposed in said housing above said upper surface of said contact pad, said upper load transfer member disposed in spaced apart relation to said lower load transfer member, said ball chamber defined by said housing, said upper transfer member, said lower transfer member and said load transfer device.

14. The wheel pad of claim 13, wherein at least one of said housing and said upper transfer member is attached to or integral with the object and said load transfer mechanism is structured and arranged to allow said load bearing assembly to pivot relative to said contact pad.

15. A wheel pad for moving an object across a surface, said wheel pad comprising:
  a contact pad having an outer skin defining an upper surface, a lower surface and a pad chamber disposed therebetween, said upper surface configured to define a concave-shaped cavity, said pad chamber enclosing a fluid and a ring-shaped torus bearing, said torus bearing having a plurality of adjacent bearings, each of said bearings being rotatably joined together by a separator structured and arranged to allow each of said bearings to independently rotate in said pad chamber, said contact pad defining a lower end of said wheel pad;
  a housing positioned above said upper surface of said contact pad;
  a clamping assembly having a plurality of clamping members that secure said contact pad to said housing;
  a retainer partially disposed around said contact pad to prevent damage to said contact pad as said wheel pad moves across the surface; and
  a load bearing assembly enclosed by said housing, said load bearing assembly comprising a load ball, a load transfer mechanism, an upper load transfer member and a lower transfer member, said load ball positioned in said concave-shaped cavity and structured and arranged to move independent of said load transfer mechanism while transferring the weight of the object from at or near an upper end of said wheel pad to said upper surface of said contact pad, at least one of said housing and said upper load transfer member located at said upper end of said wheel pad and configured to be attached to or integrally formed with the object, said upper load transfer member disposed in spaced apart relation to said lower load transfer member, said load transfer mechanism disposed between said load ball and said upper end of said wheel pad, said load transfer mechanism having a plurality of recirculating bearings movably disposed in a ball chamber, said ball chamber defined by said housing, said load ball, said upper load transfer member and said lower load transfer member such that said recirculating bearings moveably engage said load ball during movement of said wheel pad across the surface, said load ball structured and arranged to move independent of said load transfer mechanism while transferring the weight of the object from at or near an upper end of said wheel pad to said upper surface of said contact pad,
wherein said fluid and said torus bearing inside said contact pad will transfer the weight of the object from said upper surface of said contact pad to said lower surface of said contact pad so as to distribute the weight of the object substantially evenly across said lower surface of said contact pad to provide omnidirectional movement for said wheel pad across the surface as a result of lateral forces applied to said load bearing assembly.

16. The wheel pad of claim 15 further comprising a connecting plate attached to or integral with said housing, said connecting plate attached to or integral with said object.

* * * * *